US012122020B2

(12) United States Patent
Zhao

(10) Patent No.: US 12,122,020 B2
(45) Date of Patent: Oct. 22, 2024

(54) IMPACT TOOL

(71) Applicant: MAKITA CORPORATION, Anjo (JP)

(72) Inventor: Ding Zhao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/975,157

(22) Filed: Oct. 27, 2022

(65) Prior Publication Data

US 2023/0182271 A1 Jun. 15, 2023

(30) Foreign Application Priority Data

Dec. 14, 2021 (JP) ................................ 2021-202909

(51) Int. Cl.
*B25B 21/02* (2006.01)

(52) U.S. Cl.
CPC .................................. *B25B 21/026* (2013.01)

(58) Field of Classification Search
CPC ... B25B 21/026; B25B 21/02; B25B 23/1405; B25B 21/00; B25B 19/00; B25D 11/04; B25D 16/006; B25D 11/106; B25D 16/00; B25D 17/06; B25D 2216/0023
See application file for complete search history.

(56) References Cited

U.S. PATENT DOCUMENTS

2009/0056966 A1* 3/2009 Grand ..................... B25B 21/02 173/93.5
2019/0160636 A1* 5/2019 Hirabayashi ......... B25D 16/006

FOREIGN PATENT DOCUMENTS

JP 2021-037561 A 3/2021

* cited by examiner

*Primary Examiner* — Veronica Martin
(74) *Attorney, Agent, or Firm* — Oliff PLC

(57) ABSTRACT

An impact tool has a mechanical structure to strike an anvil with a striking force appropriate for a task. An impact tool includes a motor, a hammer rotatable by the motor, an anvil that receives a tip tool and is strikable by the hammer in a rotation direction, an elastic member having a front end supporting the hammer and being extendable and contractable in a front-rear direction to apply an elastic force to the hammer toward the anvil, and a positioner supporting a rear end of the elastic member. The positioner changes a support position of the positioner supporting the rear end of the elastic member in the front-rear direction.

17 Claims, 18 Drawing Sheets

FIG. 18

| MODE | ROTATIONAL SPEED/ ELASTIC FORCE |
|---|---|
| FIRST MODE | FIRST ROTATIONAL SPEED/ FIRST ELASTIC FORCE |
| SECOND MODE | FIRST ROTATIONAL SPEED/ SECOND ELASTIC FORCE |
| THIRD MODE | SECOND ROTATIONALSPEED/ FIRST ELASTIC FORCE |
| FOURTH MODE | SECOND ROTATIONAL SPEED/ SECOND ELASTIC FORCE |
| ⋮ | ⋮ |

IMPACT TOOL

CROSS-REFERENCE TO RELATED APPLICATIONS

This application claims the benefit of priority to Japanese Patent Application No. 2021-202909, filed on Dec. 14, 2021, the entire contents of which are hereby incorporated by reference.

BACKGROUND

1. Technical Field

The present disclosure relates to an impact tool.

2. Description of the Background

In the field of impact tools, an impact driver is known as described in Japanese Unexamined Patent Application Publication No. 2021-037561.

BRIEF SUMMARY

An impact tool includes an anvil and a hammer that strikes the anvil. The impact tool is to strike the anvil with a striking force appropriate for a task.

One or more aspects of the present disclosure are directed to an impact tool having a mechanical structure to strike an anvil with a striking force appropriate for a task.

A first aspect of the present disclosure provides an impact tool, including:

a motor;

a hammer rotatable by the motor;

an anvil strikable by the hammer in a rotation direction, the anvil being configured to receive a tip tool;

an elastic member having a front end supporting the hammer, the elastic member being extendable and contractable in a front-rear direction to apply an elastic force to the hammer toward the anvil; and a positioner supporting a rear end of the elastic member, the positioner being configured to change a support position of the positioner supporting the rear end of the elastic member in the front-rear direction.

A second aspect of the present disclosure provides an impact tool, including:

a motor;

a hammer rotatable by the motor; and an anvil strikable by the hammer in a rotation direction, the anvil being configured to receive a tip tool, wherein an elastic force applied to the hammer is adjustable toward the anvil.

A third aspect of the present disclosure provides an impact tool, including:

a motor;

a hammer rotatable by the motor;

an anvil strikable by the hammer in a rotation direction, the anvil being configured to receive a tip tool;

an elastic member extendable and contractable in a front-rear direction to apply an elastic force to the hammer toward the anvil; and a positioner configured to change an initial length of the elastic member.

A fourth aspect of the present disclosure provides an impact tool, including:

a motor settable to rotate at a first rotational speed or a second rotational speed;

a hammer rotatable by the motor;

an anvil strikable by the hammer in a rotation direction, the anvil being configured to receive a tip tool; and an elastic member settable between a first elastic force and a second elastic force, the elastic member being configured to apply an elastic force to the hammer toward the anvil, wherein the impact tool is operable in a first mode with a first rotational speed and a first elastic force, a second mode with the first rotational speed and a second elastic force, a third mode with a second rotational speed and the first elastic force; and a fourth mode with the second rotational speed and the second elastic force.

The impact tool according to the above aspects of the present disclosure has a mechanical structure to strike the anvil with a striking force appropriate for a task.

BRIEF DESCRIPTION OF DRAWINGS

FIG. 18 is a table showing the relationship between the operation mode of the impact tool according to the embodiment, the rotational speed of a motor, and the elastic force from an elastic member.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an impact tool 1. The impact tool 1 includes a motor 6 as a power source.

In the embodiments, a direction parallel to a motor rotation axis AX of the motor 6 is referred to as an axial direction for convenience. A direction about the motor rotation axis AX is referred to as a circumferential direction or circumferentially, or a rotation direction for convenience. A direction radial from the motor rotation axis AX is referred to as a radial direction or radially for convenience.

The motor rotation axis AX extends in the front-rear direction. A first axial direction is from the rear to the front, and a second axial direction is from the front to the rear. A position nearer the motor rotation axis AX of the motor in the radial direction, or a radial direction toward the motor rotation axis AX, is referred to as radially inward for convenience. A position farther from the motor rotation axis AX of the motor in the radial direction, or a radial direction away from the motor rotation axis AX, is referred to as radially outward for convenience.

Figure 1:
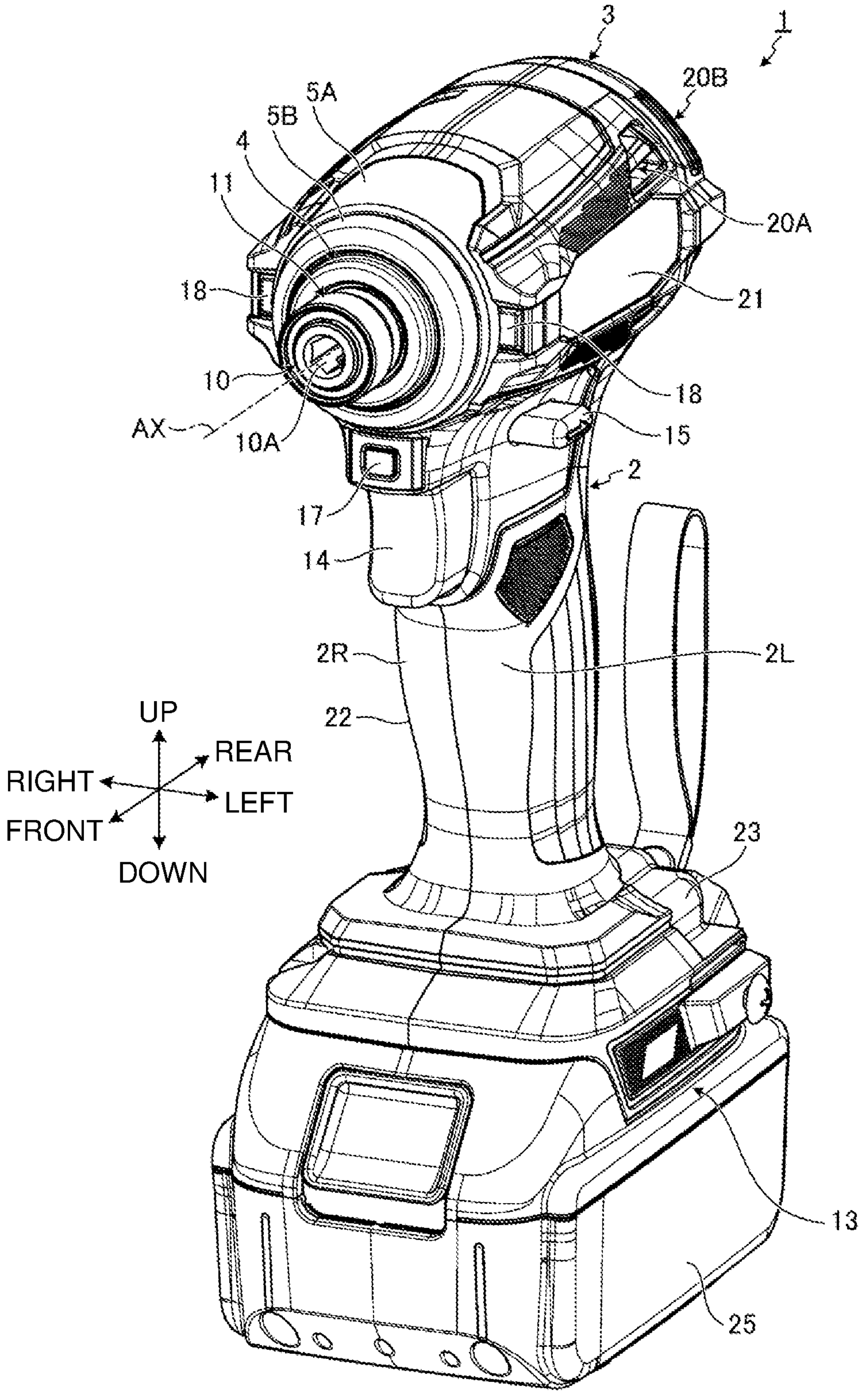
FIG. 1 is a perspective view of an impact tool according to an embodiment as viewed from the front.
Figure 2:
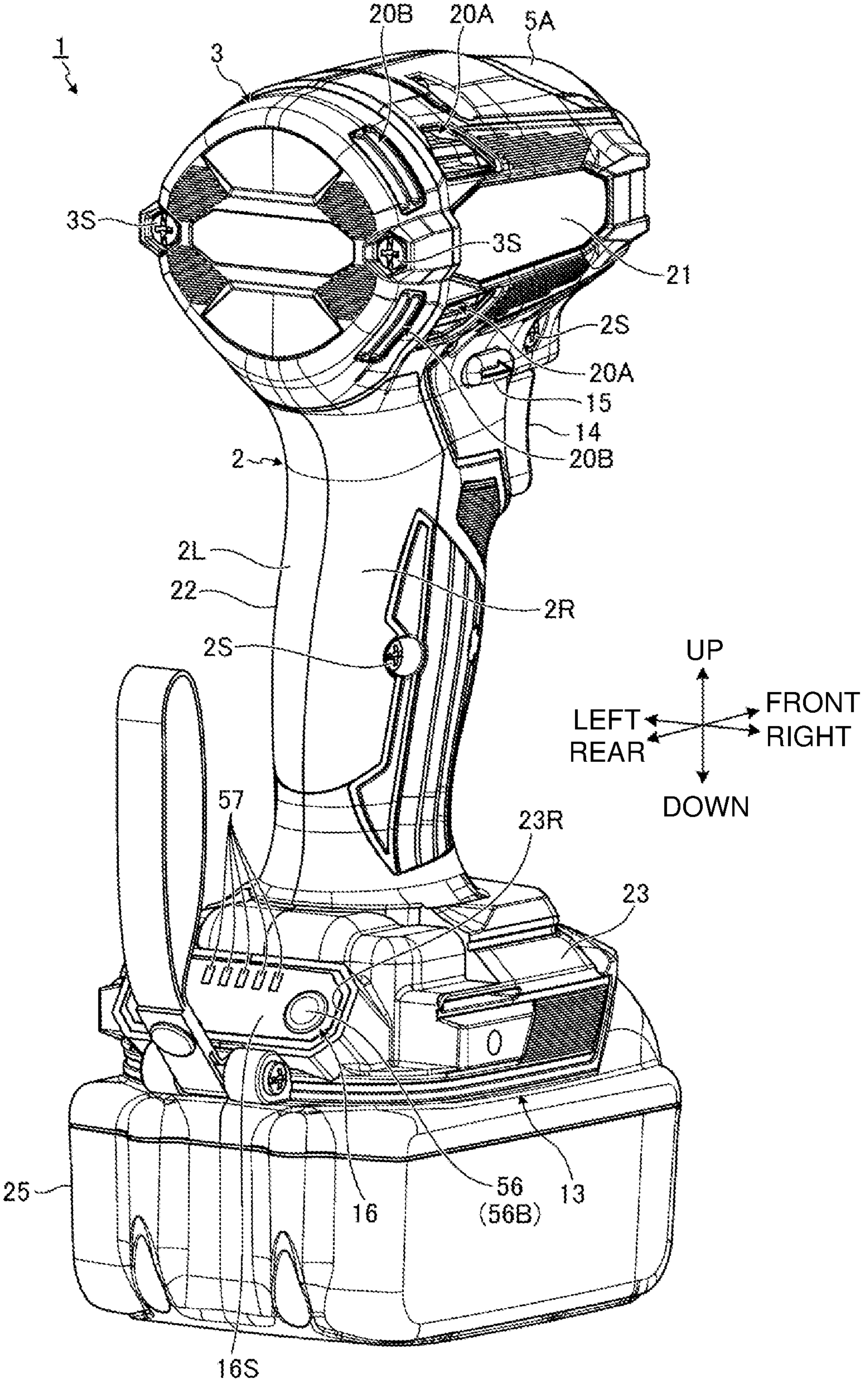
FIG. 2 is a perspective view of the impact tool according to the embodiment as viewed from the rear.
Figure 3:
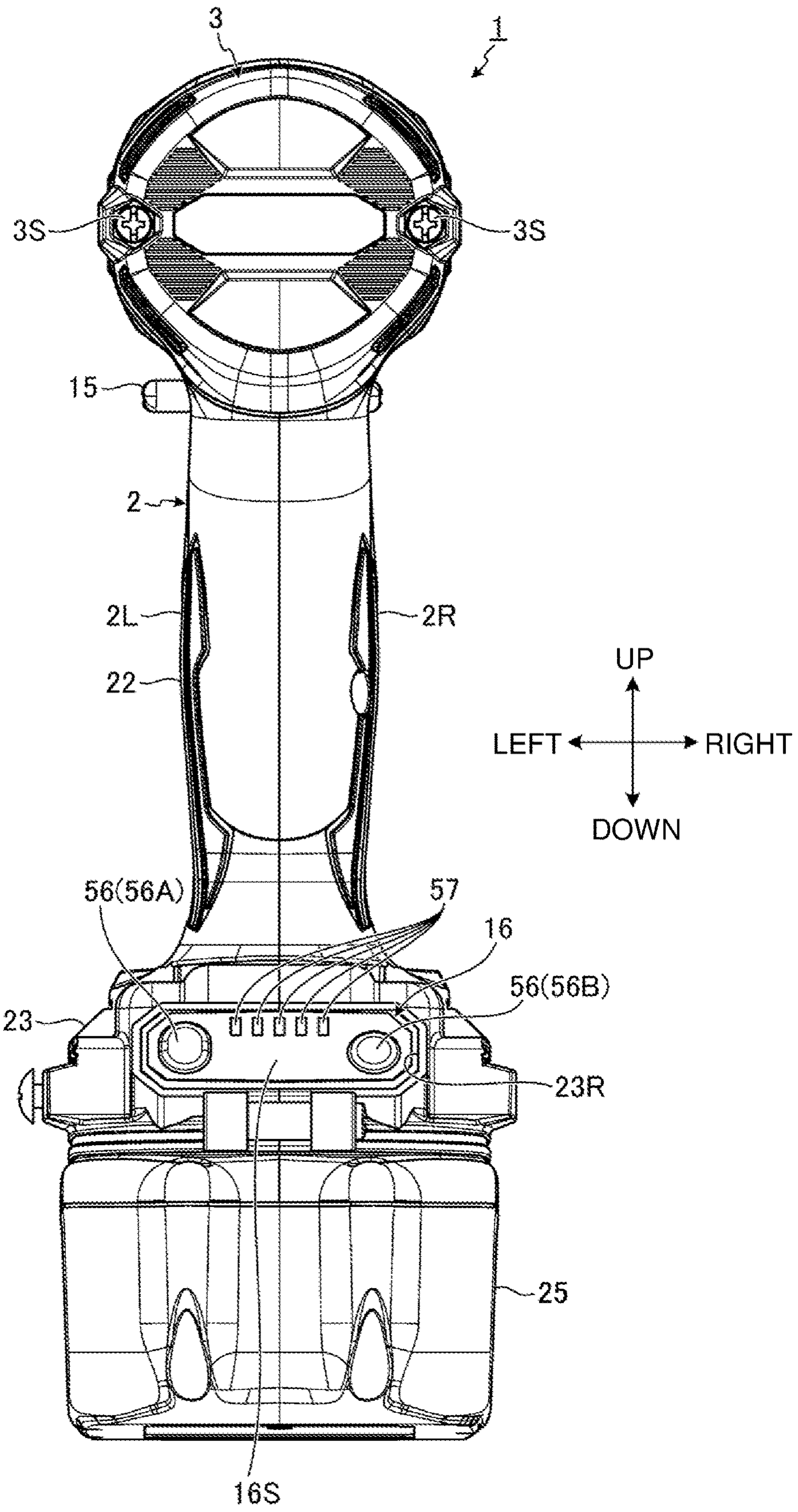
FIG. 3 is a rear view of the impact tool according to the embodiment.
Figure 4:
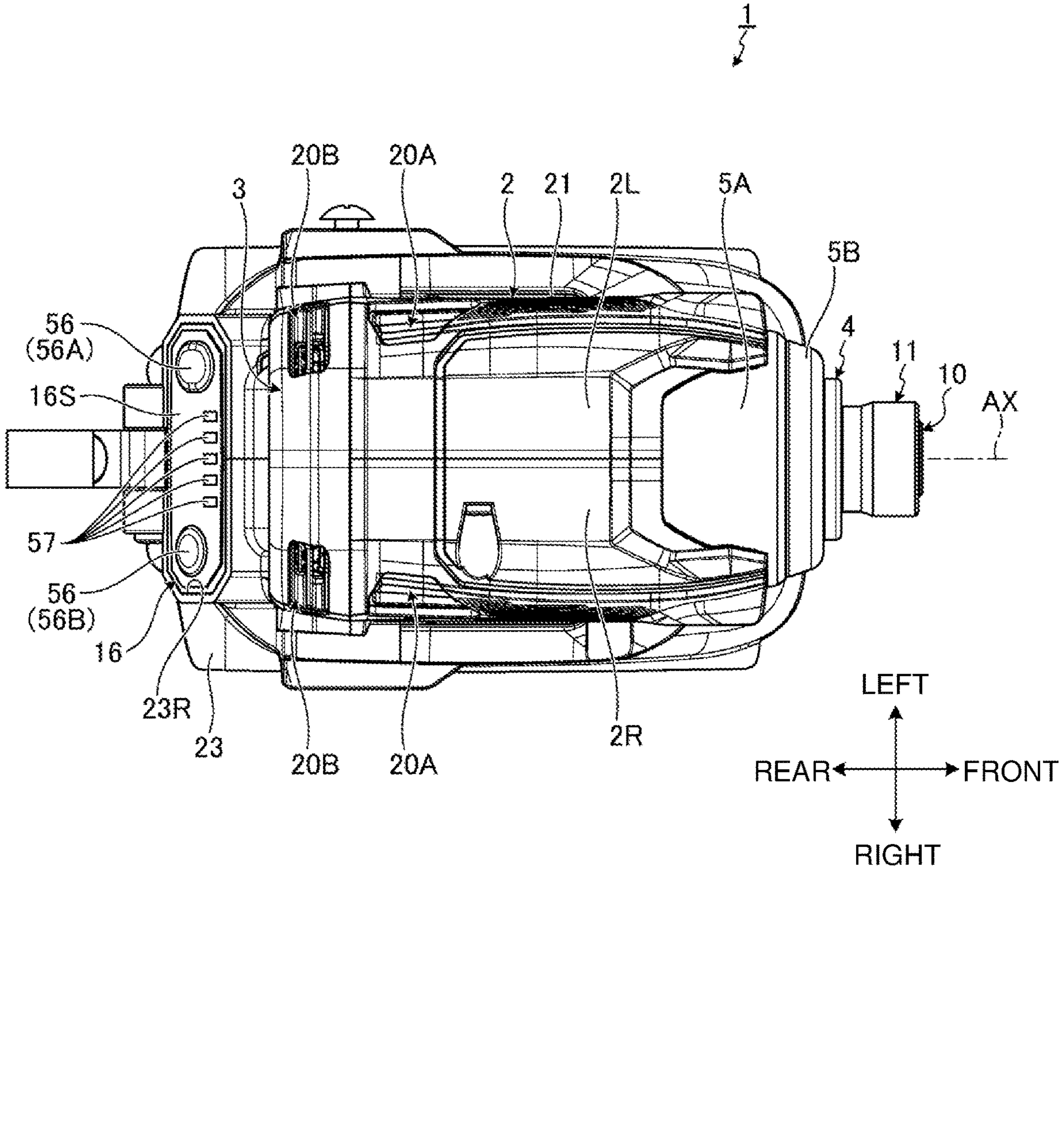
FIG. 4 is a top view of the impact tool according to the embodiment.
Figure 5:
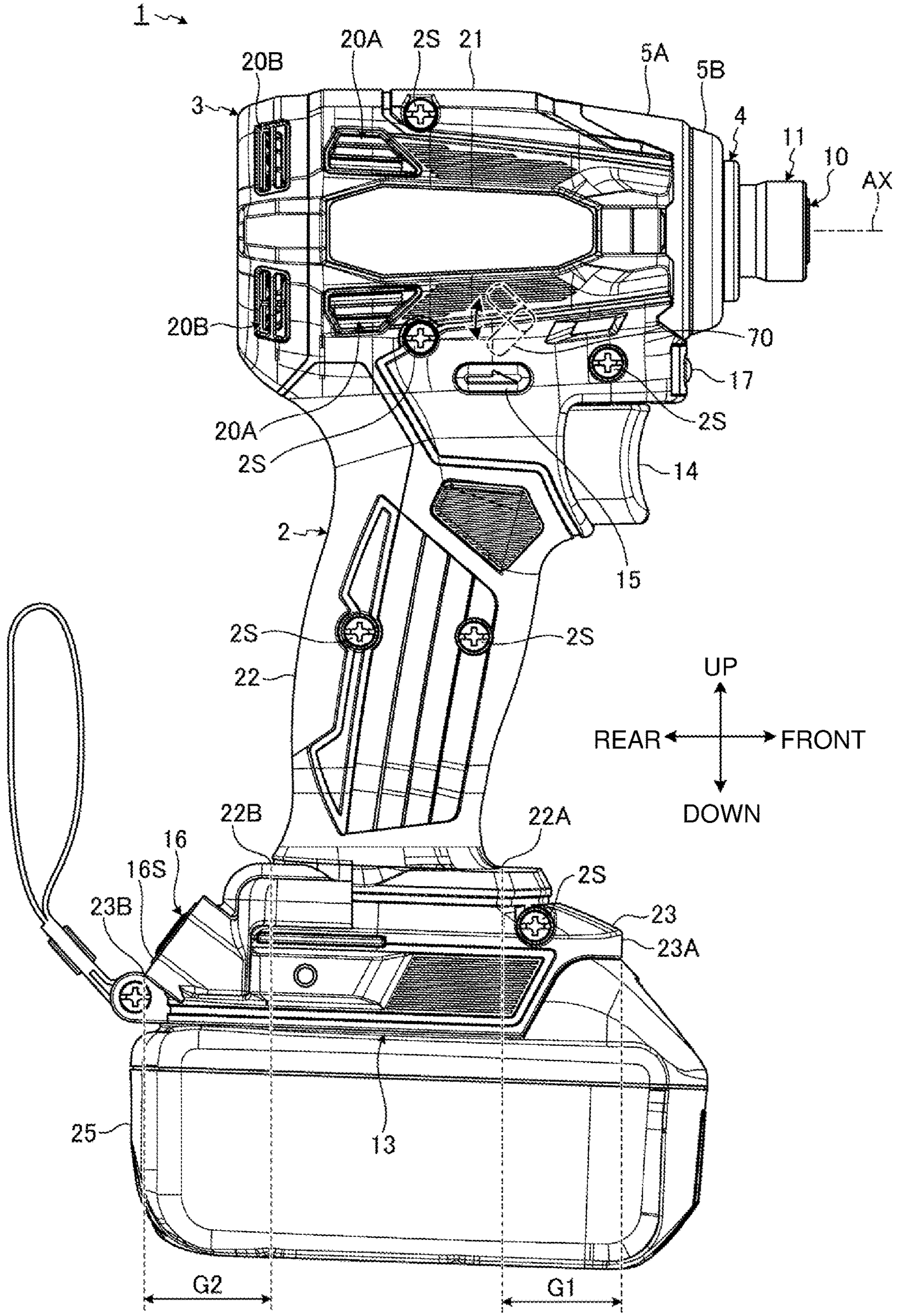
FIG. 5 is a right side view of the impact tool according to the embodiment.
Figure 6:
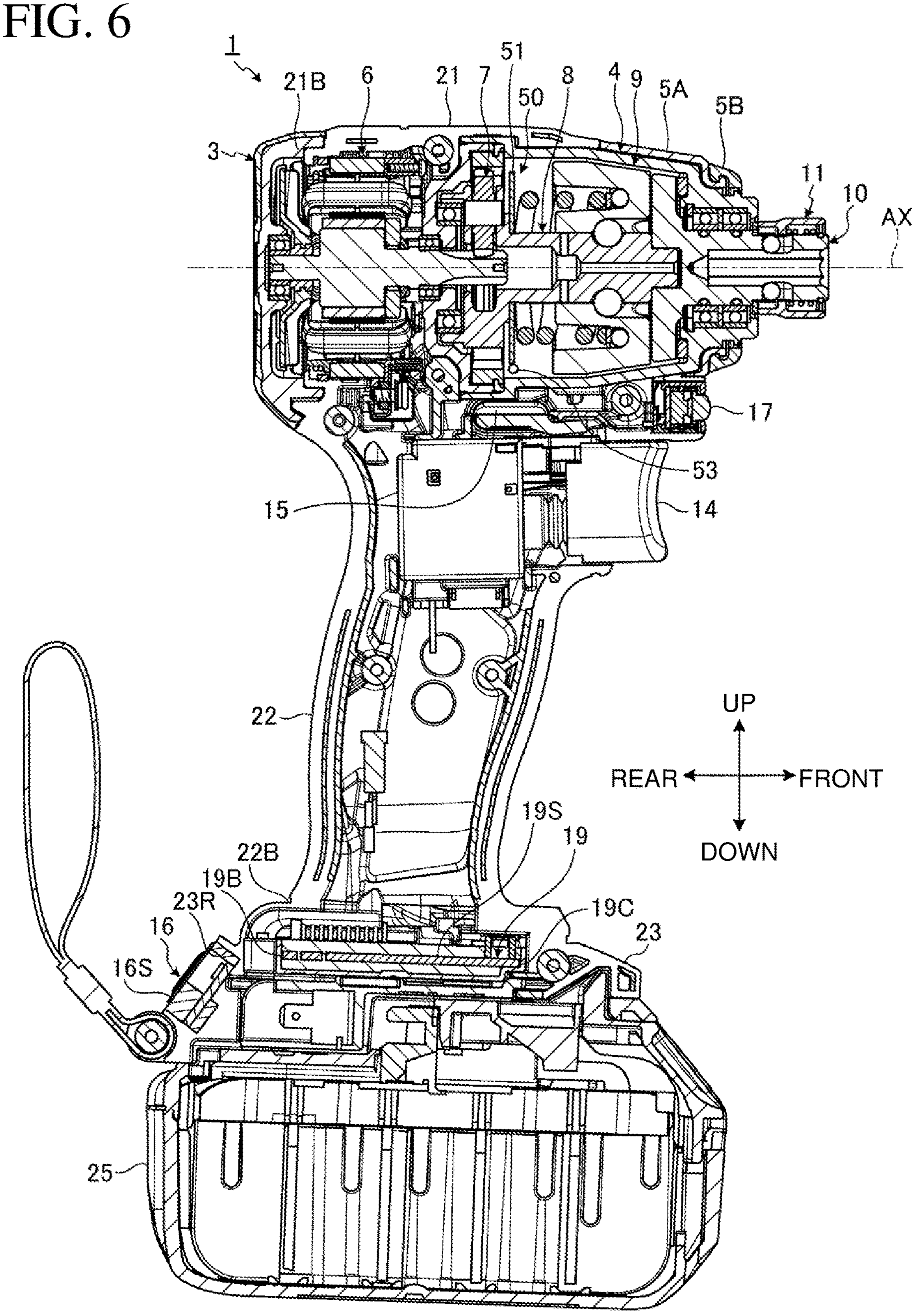
FIG. 6 is a longitudinal sectional view of the impact tool according to the embodiment.
Figure 7:
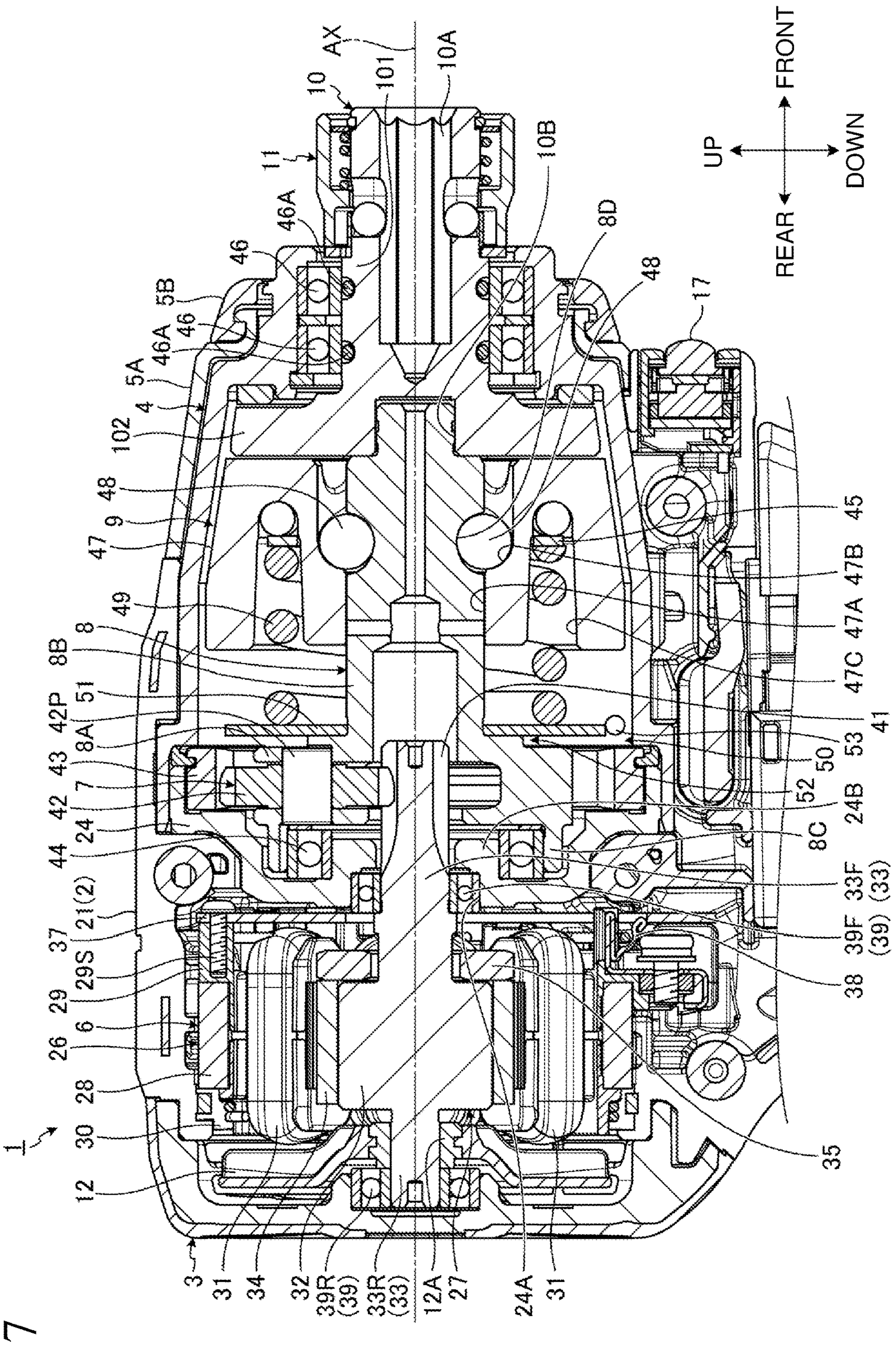
FIG. 7 is a longitudinal sectional view of an upper portion of the impact tool according to the embodiment.
Figure 8:
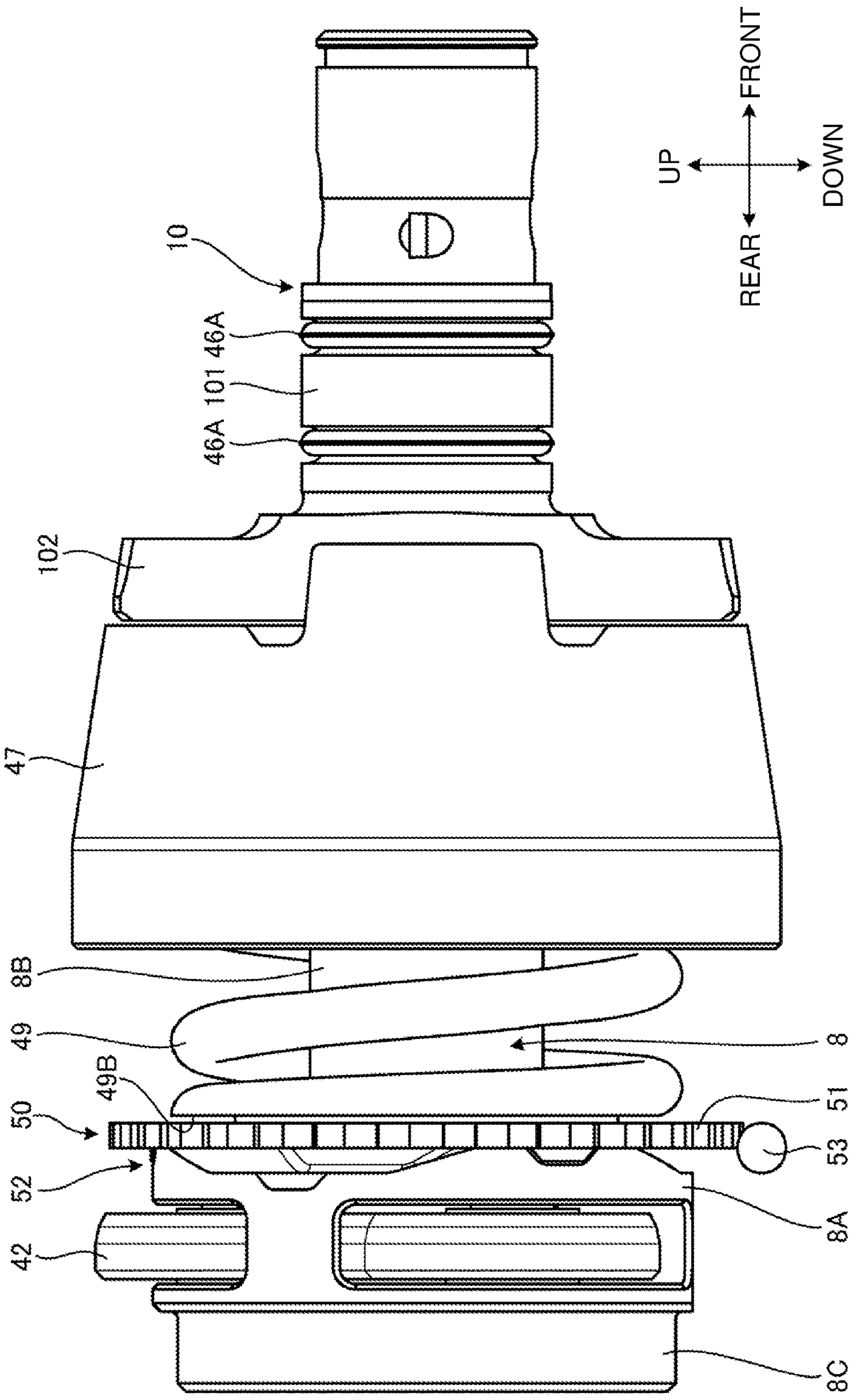
FIG. 8 is a diagram of an example internal structure of the impact tool according to the embodiment.

FIG. 1 is a perspective view of the impact tool 1 according to an embodiment as viewed from the front. FIG. 2 is a perspective view of the impact tool 1 according to the embodiment as viewed from the rear. FIG. 3 is a rear view of the impact tool 1 according to the embodiment. FIG. 4 is a top view of the impact tool 1 according to the embodiment. FIG. 5 is a right side view of the impact tool 1 according to the embodiment. FIG. 6 is a longitudinal sectional view of the impact tool 1 according to the embodiment. FIG. 7 is a longitudinal sectional view of an upper portion of the impact tool 1 according to the embodiment. FIG. 8 is a horizontal sectional view of the upper portion of the impact tool 1 according to the embodiment.

The impact tool 1 according to the embodiment is an impact driver that is a screwing machine. The impact tool 1 includes a housing 2, a rear cover 3, a hammer case 4, a hammer case cover 5A, a bumper 5B, the motor 6, a reducer 7, a spindle 8, a striker 9, an anvil 10, a tool holder 11, a fan 12, a battery mount 13, a trigger lever 14, a forward-reverse switch lever 15, an operation display 16, a mode switch 17, light assemblies 18, and a control circuit board 19.

The housing 2 is formed from a synthetic resin. The housing 2 in the embodiment is formed from nylon. The housing 2 includes a left housing 2L and a right housing 2R. The right housing 2R is located on the right of the left housing 2L. The left and right housings 2L and 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6. The motor compartment 21 accommodates at least a part of the hammer case 4.

The grip 22 extends downward from the motor compartment 21. The trigger lever 14 is located in an upper portion of the grip 22. The grip 22 is grippable by an operator.

The battery holder 23 is connected to a lower end of the grip 22. The battery holder 23 has larger outer dimensions than the grip 22 in the front-rear and lateral directions.

The rear cover 3 is formed from a synthetic resin. The rear cover 3 is located behind the motor compartment 21. The rear cover 3 accommodates at least a part of the fan 12. The fan 12 is located circumferentially inward from the rear cover 3. The rear cover 3 covers an opening at the rear end of the motor compartment 21. The rear cover 3 is fastened to the rear end of the motor compartment 21 with two screws 3S.

The motor compartment 21 has inlets 20A. The rear cover 3 has outlets 20B. Air outside the housing 2 flows into an internal space of the housing 2 through the inlets 20A. Air inside the housing 2 flows out of the housing 2 through the outlets 20B.

The hammer case 4 is formed from a metal. The hammer case 4 in the embodiment is formed from aluminum. The hammer case 4 is cylindrical. The hammer case 4 connects to a front portion of the motor compartment 21. A bearing box 24 is fixed to a rear portion of the hammer case 4. The bearing box 24 has a thread on its outer periphery. The hammer case 4 has a threaded groove on its inner periphery. The thread on the bearing box 24 is engaged with the threaded groove on the hammer case 4 to fasten the bearing box 24 and the hammer case 4 together. The hammer case 4 is held between the left housing 2L and the right housing 2R. The hammer case 4 is at least partially accommodated in the motor compartment 21. The bearing box 24 is fixed to the motor compartment 21 and the hammer case 4.

The hammer case 4 accommodates at least parts of the reducer 7, the spindle 8, the striker 9, and the anvil 10. The reducer 7 is located at least partially inside the bearing box 24. The reducer 7 includes multiple gears.

The hammer case cover 5A covers at least a part of the surface of the hammer case 4. The hammer case cover 5A protects the hammer case 4. The hammer case cover 5A reduces contact between the hammer case 4 and objects nearby.

The bumper 5B is located in front of the hammer case 4. The bumper 5B is annular. The bumper 5B reduces contact between the hammer case 4 and objects nearby. The bumper 5B reduces the impact of contact with an object.

The motor 6 is a power source for the impact tool 1 rotated by electric power. The motor 6 is a brushless inner-rotor motor. The motor 6 includes a stator 26 and a rotor 27. The stator 26 is supported on the motor compartment 21. The rotor 27 is located at least partially inward from the stator 26. The rotor 27 rotates relative to the stator 26. The rotor 27 rotates about the motor rotation axis AX extending in the front-rear direction.

The stator 26 includes a stator core 28, a front insulator 29, a rear insulator 30, and multiple coils 31.

The stator core 28 is located radially outside the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other with the front insulator 29 and the rear insulator 30. The coils 31 are connected to one another with fusing terminals 38. The coils 31 are connected to the control circuit board 19 with lead wires (not shown).

The rotor 27 rotates about the motor rotation axis AX. The rotor 27 includes a rotor core 32, a rotor shaft 33, a rotor magnet 34, and a sensor magnet 35.

The rotor core 32 and the rotor shaft 33 are formed from steel. The rotor shaft 33 protrudes from the end faces of the rotor core 32 in the front-rear direction. The rotor shaft 33 includes a front shaft 33F and a rear shaft 33R. The front shaft 33F protrudes frontward from the front end face of the rotor core 32. The rear shaft 33R protrudes rearward from the rear end face of the rotor core 32.

The rotor magnet 34 is fixed to the rotor core 32. The rotor magnet 34 is a circular plate. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes a circular circuit board and a rotation detection element. The circuit board has a hole at the center. The rotation detection element is supported by the circuit board. The sensor board 37 at least partially faces the sensor magnet 35. The rotation detection element detects the position of the sensor magnet 35 on the rotor 27 to detect the position of the rotor 27 in the rotation direction. The rotation detection element is, for example, a Hall device.

The rotor shaft 33 is supported by a rotor bearing 39 in a rotatable manner. The rotor bearing 39 includes a front rotor bearing 39F and a rear rotor bearing 39R. The front rotor bearing 39F supports the front shaft 33F in a rotatable manner. The rear rotor bearing 39R supports the rear shaft 33R in a rotatable manner.

The front rotor bearing 39F is held by the bearing box 24. The bearing box 24 has a recess 24A. The recess 24A is recessed frontward from the rear surface of the bearing box 24. The front rotor bearing 39F is received in the recess 24A. The rear rotor bearing 39R is held by the rear cover 3. The front end of the rotor shaft 33 is located inside the hammer case 4 through the opening in the bearing box 24.

A pinion gear 41 is located on the front end of the rotor shaft 33. The pinion gear 41 is connected to at least a part of the reducer 7. The rotor shaft 33 is connected to the reducer 7 with the pinion gear 41 in between.

The reducer 7 is located frontward from the motor 6. The reducer 7 connects the rotor shaft 33 and the spindle 8 together. The reducer 7 transmits rotation of the rotor 27 to the spindle 8. The reducer 7 rotates the spindle 8 at a lower rotational speed than the rotor shaft 33. The reducer 7 includes a planetary gear assembly.

The reducer 7 includes multiple gears. The rotor 27 drives the gears in the reducer 7.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are supported by the spindle 8 in a rotatable manner with a pin 42P in between. The spindle 8 is rotated by the planetary gears 42. The internal gear 43 includes internal teeth that mesh with the planetary gears 42. The internal gear 43 is fixed to the bearing box 24. The internal gear 43 is constantly nonrotatable relative to the bearing box 24.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The revolving planetary gears 42 rotate the spindle 8 connected to the planetary gears 42 with the pin 42P at a lower rotational speed than the rotor shaft 33.

The spindle 8 is located frontward from at least a part of the motor 6. The spindle 8 is located frontward from the stator 26. The spindle 8 is located at least partially frontward from the rotor 27. The spindle 8 is located at least partially in front of the reducer 7. The spindle 8 is located behind the anvil 10. The spindle 8 is rotated by the rotor 27. The spindle 8 rotates with a rotational force from the rotor 27 transmitted by the reducer 7. The spindle 8 transmits a rotational force from the motor 6 to the anvil 10.

The spindle 8 includes a flange 8A and a spindle shaft 8B. The spindle shaft 8B protrudes frontward from the flange 8A. The planetary gears 42 are supported by the flange 8A in a rotatable manner with the pin 42P in between. The spindle 8 has its rotation axis aligned with the motor rotation axis AX of the motor 6. The spindle 8 rotates about the motor rotation axis AX. The spindle 8 is supported by a spindle bearing 44 in a rotatable manner. The spindle 8 includes a protrusion 8C on its rear end. The protrusion 8C protrudes rearward from the flange 8A. The protrusion 8C surrounds the spindle bearing 44.

The bearing box 24 at least partially surrounds the spindle 8. The spindle bearing 44 is held by the bearing box 24. The bearing box 24 includes a protrusion 24B. The protrusion 24B protrudes frontward from the front surface of the bearing box 24. The spindle bearing 44 surrounds the protrusion 24B.

The striker 9 is driven by the motor 6. A rotational force from the motor 6 is transmitted to the striker 9 through the reducer 7 and the spindle 8. The striker 9 strikes the anvil 10 in the rotation direction in response to the rotational force of the spindle 8 rotated by the motor 6. The striker 9 includes a hammer 47, balls 48, and a coil spring 49. The striker 9 including the hammer 47 is accommodated in the hammer case 4.

The hammer 47 is located frontward from the reducer 7. The hammer 47 surrounds the spindle 8. The hammer 47 is held by the spindle 8. The balls 48 are located between the spindle 8 and the hammer 47. The coil spring 49 is supported by the spindle 8 and the hammer 47.

The hammer 47 is cylindrical. The hammer 47 surrounds the spindle shaft 8B. The hammer 47 has a hole 47A for receiving the spindle shaft 8B.

The hammer 47 is rotated by the motor 6. A rotational force from the motor 6 is transmitted to the hammer 47 through the reducer 7 and the spindle 8. The hammer 47 is rotatable together with the spindle 8 in response to the rotational force of the spindle 8 rotated by the motor 6. The hammer 47 has its rotation axis aligned with the rotation axis of the spindle 8 and the motor rotation axis AX of the motor 6. The hammer 47 rotates about the motor rotation axis AX.

The balls 48 are formed from a metal such as steel. The balls 48 are located between the spindle shaft 8B and the hammer 47. The spindle 8 has a spindle groove 8D. The spindle groove 8D receives at least parts of the balls 48. The spindle groove 8D is on the outer surface of the spindle shaft 8B. The hammer 47 has a hammer groove 47B. The hammer groove 47B receives at least parts of the balls 48. The hammer groove 47B is on the inner surface of the hammer 47. The balls 48 are received in the spindle groove 8D and in the hammer groove 47B. The balls 48 roll along the spindle groove 8D and the hammer groove 47B. The hammer 47 is movable together with the balls 48. The spindle 8 and the hammer 47 move relative to each other in the axial and rotation directions within a movable range defined by the spindle groove 8D and the hammer groove 47B.

The coil spring 49 generates an elastic force for moving the hammer 47 forward. The coil spring 49 is located between the flange 8A and the hammer 47. The hammer 47 has an annular recess 47C on its rear surface. The recess 47C is recessed frontward from the rear surface of the hammer 47. A washer 45 is received in the recess 47C. The rear end of the coil spring 49 is supported by the flange 8A. The front end of the coil spring 49 is received in the recess 47C and supported by the washer 45.

The anvil 10 is located frontward from the motor 6. The anvil 10 is an output unit of the impact tool 1 that rotates in response to the rotational force of the rotor 27. The anvil 10 is located at least partially frontward from the hammer 47. The anvil 10 has a tool hole 10A to receive a tip tool. The anvil 10 has the tool hole 10A at its front end. The tip tool is attached to the anvil 10.

The anvil 10 has an anvil recess 10B on its rear end. The anvil recess 10B is recessed frontward from the rear end of the anvil 10. The spindle 8 is located behind the anvil 10. The spindle shaft 8B has its front end received in the anvil recess 10B.

The anvil 10 includes a rod-like anvil shaft 101 and anvil protrusions 102. The tool hole 10A is located at the front end of the anvil shaft 101. The tip tool is attached to the anvil shaft 101. The anvil protrusions 102 are located on the rear end of the anvil 10. The anvil protrusions 102 protrude radially outward from the rear end of the anvil shaft 101.

The anvil 10 is supported by anvil bearings 46 in a rotatable manner. The anvil 10 has its rotation axis aligned with the rotation axis of the hammer 47, the rotation axis of the spindle 8, and the motor rotation axis AX of the motor 6. The anvil 10 rotates about the motor rotation axis AX. The anvil bearings 46 are located inside the hammer case 4. The anvil bearings 46 are held by the hammer case 4. In the embodiment, two anvil bearings 46 are arranged in the axial direction. The anvil bearings 46 support the front of the anvil shaft 101 in a rotatable manner. O-rings 46A are located between the anvil bearings 46 and the anvil shaft 101.

The hammer 47 can at least partially come in contact with the anvil protrusions 102. The hammer 47 includes hammer protrusions 47D at the front. The hammer protrusions 47D protrude frontward. The hammer protrusions 47D and the anvil protrusions 102 can come in contact with each other. The motor 6 operates in this state to cause the anvil 10 to rotate together with the hammer 47 and the spindle 8 for a predetermined time period.

The anvil 10 is struck by the hammer 47 in the rotation direction. When, for example, the anvil 10 receives a higher load in a screwing operation, the anvil 10 may fail to rotate with power generated by the motor 6 alone. This stops the rotation of the anvil 10 and the hammer 47. The spindle 8 and the hammer 47 are movable relative to each other in the axial and circumferential directions with the balls 48 in between. Although the hammer 47 stops rotating, the spindle 8 continues to rotate with power generated by the motor 6. When the hammer 47 stops rotating and the spindle 8 continues to rotate, the balls 48 move backward as being guided along the spindle groove 8D and the hammer groove 47B. The hammer 47 receives a force from the balls 48 to move backward with the balls 48. In other words, the hammer 47 moves backward when the anvil 10 stops rotating and the spindle 8 rotates. Thus, the hammer 47 and the anvil protrusions 102 are out of contact from each other.

The coil spring 49 generates an elastic force for moving the hammer 47 forward. The hammer 47 that has moved backward then moves forward under the elastic force from the coil spring 49. When moving forward, the hammer 47 receives a force in the rotation direction from the balls 48. In other words, the hammer 47 moves forward while rotating. The hammer 47 then comes in contact with the anvil protrusions 102 while rotating. Thus, the anvil protrusions 102 are struck by the hammer protrusions 47D in the rotation direction. The anvil 10 receives power from the motor 6 and the inertial force from the hammer 47. The anvil 10 thus rotates with high torque about the motor rotation axis AX.

The tool holder 11 surrounds a front portion of the anvil 10. The tool holder 11 holds the tip tool received in the tool hole 10A.

The fan 12 is located rearward from the stator 26. The fan 12 generates an airflow for cooling the motor 6. The fan 12 is fixed to at least a part of the rotor 27. The fan 12 is fixed to the rear of the rear shaft 33R with a bush 12A. The fan 12 is located between the rear rotor bearing 39R and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 20A. Air flowing into the internal space of the housing 2 flows through the housing 2 and cools the motor 6. The fan 12 then rotates to cause air in the housing 2 to flow out of the housing 2 through the outlets 20B.

The battery mount 13 is located in a lower portion of the battery holder 23. The battery mount 13 is connected to a battery pack 25. The battery pack 25 is attached to the battery mount 13 in a detachable manner. The battery pack 25 is inserted into the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25. The operation display 16 is operated by power supplied from the battery pack 25. The control circuit board 19 is operated by power supplied from the battery pack 25.

The trigger lever 14 is located on the grip 22. The trigger lever 14 activates the motor 6. The trigger lever 14 is operable to switch the motor 6 between the driving state and the stopped state.

The forward-reverse switch lever 15 is located in the upper portion of the grip 22. The forward-reverse switch lever 15 is operable by the operator. The forward-reverse switch lever 15 is operable to switch the rotation direction of the motor 6 between forward and reverse. This operation thus switches the rotation direction of the spindle 8.

The operation display 16 is located in a rear portion of the battery holder 23. The operation display 16 is operable to switch the operation mode of the motor 6. No operation display is placed on a front, left, or right portion of the battery holder 23.

The mode switch 17 is located above the trigger lever 14. The mode switch 17 changes the operation mode of the motor 6.

The light assemblies 18 emit illumination light. The light assemblies 18 illuminate the anvil 10 and an area around the anvil 10 with illumination light. The light assemblies 18 illuminate an area ahead of the anvil 10 with illumination light. The light assemblies 18 illuminate the tip tool attached to the anvil 10 and an area around the tip tool with illumination light. The light assemblies 18 in the embodiment are located on left and right portions of the hammer case 4.

The control circuit board 19 functions as a controller for the impact tool 1 and controls at least the motor 6. The control circuit board 19 outputs control signals for controlling the motor 6. The control circuit board 19 includes a printed circuit board (PCB) on which multiple electronic components are mounted. The electronic components are mounted on a surface 19S of the control circuit board 19. The surface 19S of the control circuit board 19 faces upward.

Examples of the electronic components mounted on the printed circuit board include a processor such as a central processing unit (CPU), a nonvolatile memory such as a read-only memory (ROM) or a storage device, a volatile memory such as a random-access memory (RAM), a transistor, and a resistor. The control circuit board 19 is accommodated in the battery holder 23. The control circuit board 19 accommodated in a board case 19C is placed inside the battery holder 23.

The control circuit board 19 switches the operation mode of the motor 6 in accordance with the operation of the impact tool 1. The operation mode of the motor 6 refers to a method or pattern for operating the motor 6. At least either the operation display 16 or the mode switch 17 is operated to switch the operation mode of the motor 6.

As shown in FIG. 5, a first distance G1 is shorter than or equal to a second distance G2 in the front-rear direction. The first distance G1 is the distance between the front end 22A of a lower end portion of the grip 22 and the front end 23A of the battery holder 23. The second distance G2 is the distance between a rear end 22B of the lower end portion of the grip 22 and a rear end 23B of the battery holder 23.

As shown in FIG. 6, a rear end 19B of the control circuit board 19 is located rearward from the rear end 22B of the grip 22 in the front-rear direction.

The electronic components are mounted on the surface 19S of the control circuit board 19. The surface 19S of the control circuit board 19 faces upward. The surface 19S of the control circuit board 19 is parallel to the motor rotation axis AX.

FIG. 8 is a diagram of an example internal structure of the impact tool 1 according to the embodiment. As shown in FIG. 8, the impact tool 1 includes a positioner 50. The positioner 50 supports a rear end 49B of the coil spring (elastic member) 49 and can change the support position at which the positioner 50 supports the rear end 49B in the front-rear direction. The positioner 50 can change the initial length of the coil spring 49. The positioner 50 in the impact tool 1 can adjust the elastic force applied to the hammer 47 toward the anvil 10.

The positioner 50 includes a first cam (cam member) 51 and a second cam 52. The first cam 51 and the second cam 52 rotate as the motor 6 rotates. The first cam 51 supports the rear end 49B of the coil spring 49 at front end faces 63A of connecting portions 63 (described later). The first cam 51 moves in the front-rear direction as its rotational position relative to the second cam 52 changes. This changes the support position of the rear end 49B of the coil spring 49 in the front-rear direction.

The first cam 51 is movable between multiple positions in the front-rear direction. This changes the support position of the rear end 49B of the coil spring 49 between multiple positions in the front-rear direction.

Figure 9:
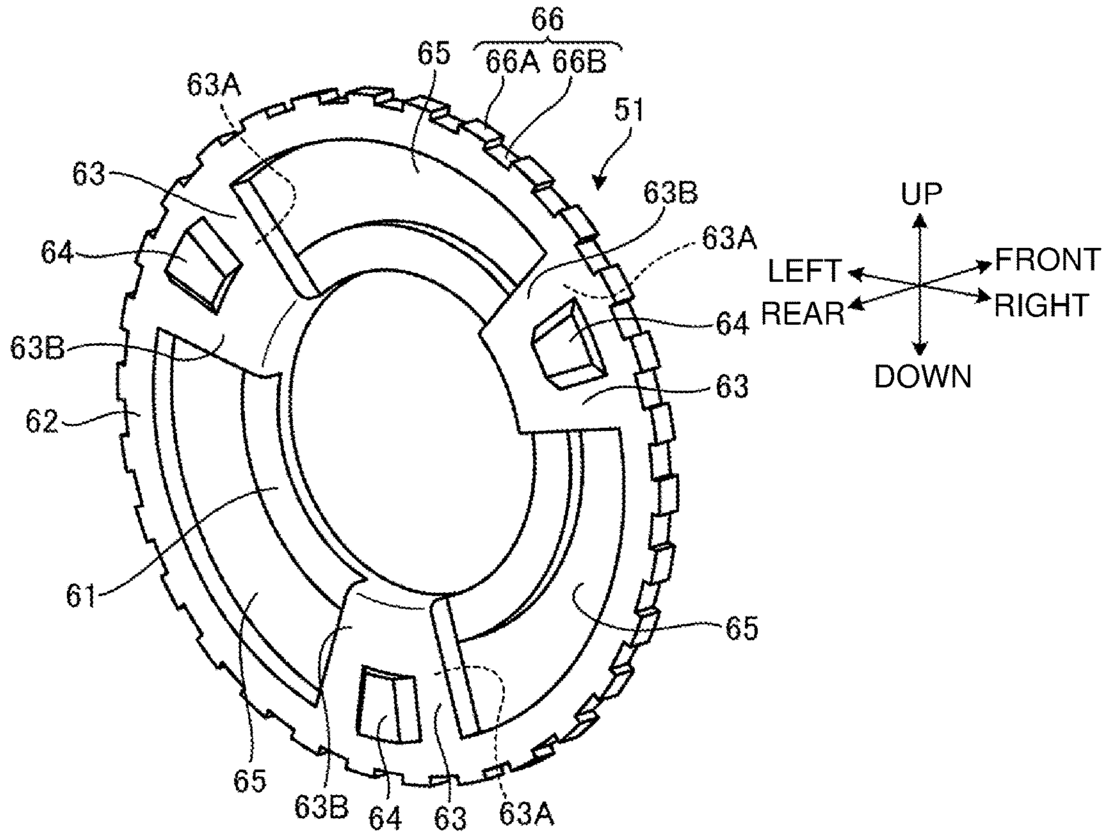
FIG. 9 is a diagram of an example cam in the impact tool according to the embodiment.

FIG. 9 is a diagram of the first cam 51 in the impact tool 1 according to the embodiment. The first cam 51 includes an inner ring 61, an outer ring 62, the connecting portions 63, projections 64, an opening 65, and recess-protrusion portions 66, as shown in FIG. 9.

The inner ring 61 is an annular ring centered on the motor rotation axis AX. The inner ring 61 receives the spindle shaft 8B.

The outer ring 62 is located outside the inner ring 61. The outer ring 62 is an annular ring centered on the motor rotation axis AX. The outer ring 62 is located rearward in the central axial direction from the inner ring 61.

The connecting portions 63 are flat plates that connect the inner ring 61 and the outer ring 62. The connecting portions 63 are, for example, at three positions with a regular pitch about the motor rotation axis AX. The connecting portions 63 may not be at three positions, but may be at two, four, or more positions. The front end faces 63A of the connecting portions 63 support the rear end 49B of the coil spring 49.

The projections 64 protrude rearward from rear end faces 63B of the connecting portions 63. Three projections 64 are located on the respective rear end faces 63B.

The opening 65 is defined by the inner ring 61, the outer ring 62, and the connecting portions 63. The opening 65 extends through the first cam 51 in the front-rear direction.

The recess-protrusion portions 66 are arranged on the outer circumference of the outer ring 62. The recess-protrusion portions 66 include protrusions 66A and recesses 66B arranged alternately in the circumferential direction.

The first cam 51 may include a sensor magnet. In this case, a rotation detection element such as a Hall device for detecting the position of the sensor detection magnet is located near the first cam 51 to detect the position of the first cam 51 in the rotation direction.

Figure 10:
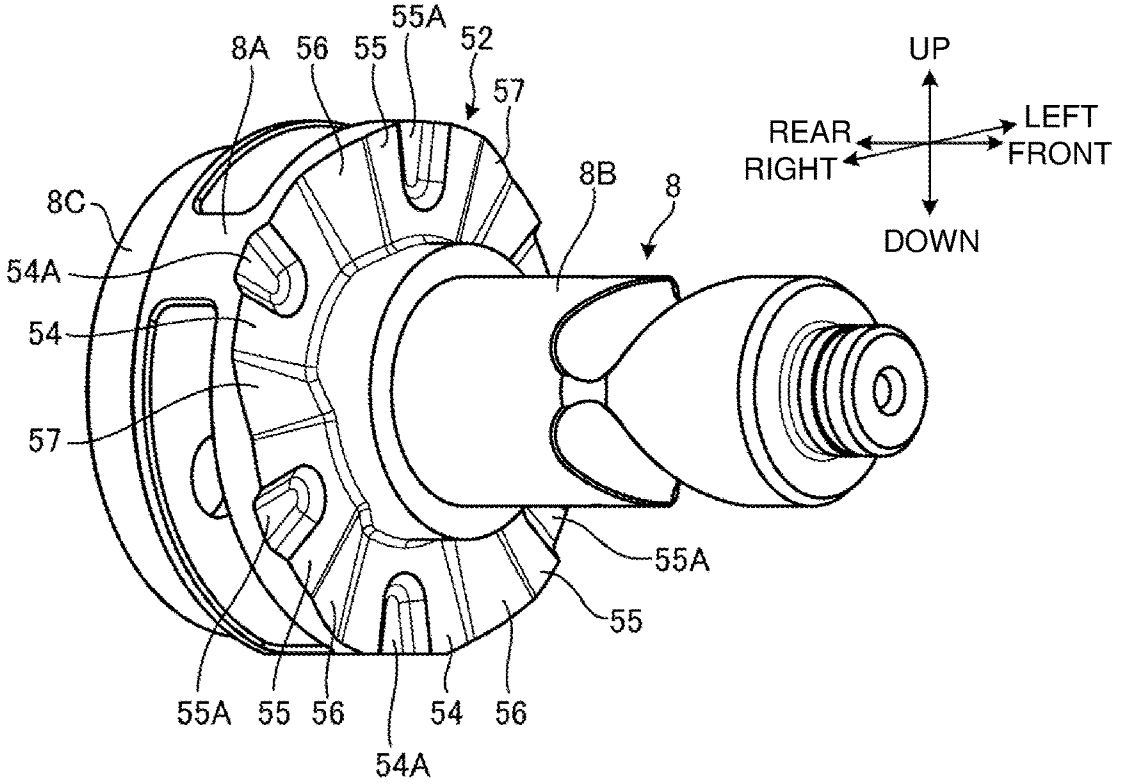
FIG. 10 is a perspective view of an example support in the impact tool according to the embodiment.

The flange 8A on the spindle 8 includes a second cam 52 in contact with the first cam 51. FIG. 10 is a perspective view of the second cam 52 in the impact tool 1 according to the embodiment. As shown in FIG. 10, the second cam 52 includes multiple first support surfaces 54 and second support surfaces 55 that support the first cam 51.

The first support surfaces 54 and the second support surfaces 55 are flat surfaces perpendicular to the motor rotation axis AX. The first support surfaces 54 are at a first position relatively rearward in the axial direction of the motor rotation axis AX. The second support surfaces 55 are at a second position relatively frontward in the axial direction. The first support surfaces 54 and the second support surfaces 55 are arranged at three positions with a regular pitch about the motor rotation axis AX. The first support surfaces 54 and the second support surfaces 55 are arranged alternately about the motor rotation axis AX.

The first support surfaces 54 include projection-receiving portions 54A. The projection-receiving portions 54A are aligned to receive the three projections 64 on the first cam 51 at a time. The second support surface 55 includes projection-receiving portions 55A. The projection-receiving portions 55A are aligned to receive the three projections 64 on the first cam 51 at a time. The projection-receiving portions 54A and the projection-receiving portions 55A can be switched to receive the three projections 64.

More specifically, the three projections 64 are received in the projection-receiving portions 54A without being received in the projection-receiving portions 55A, or are received in the projection-receiving portions 55A without being received in the projection-receiving portions 54A. The projection-receiving portions 54A and the projection-receiving portions 55A are sized and shaped to cause the projections 64 received in the projection-receiving portions to be engaged with the flange 8A about the motor rotation axis AX.

Figure 11:
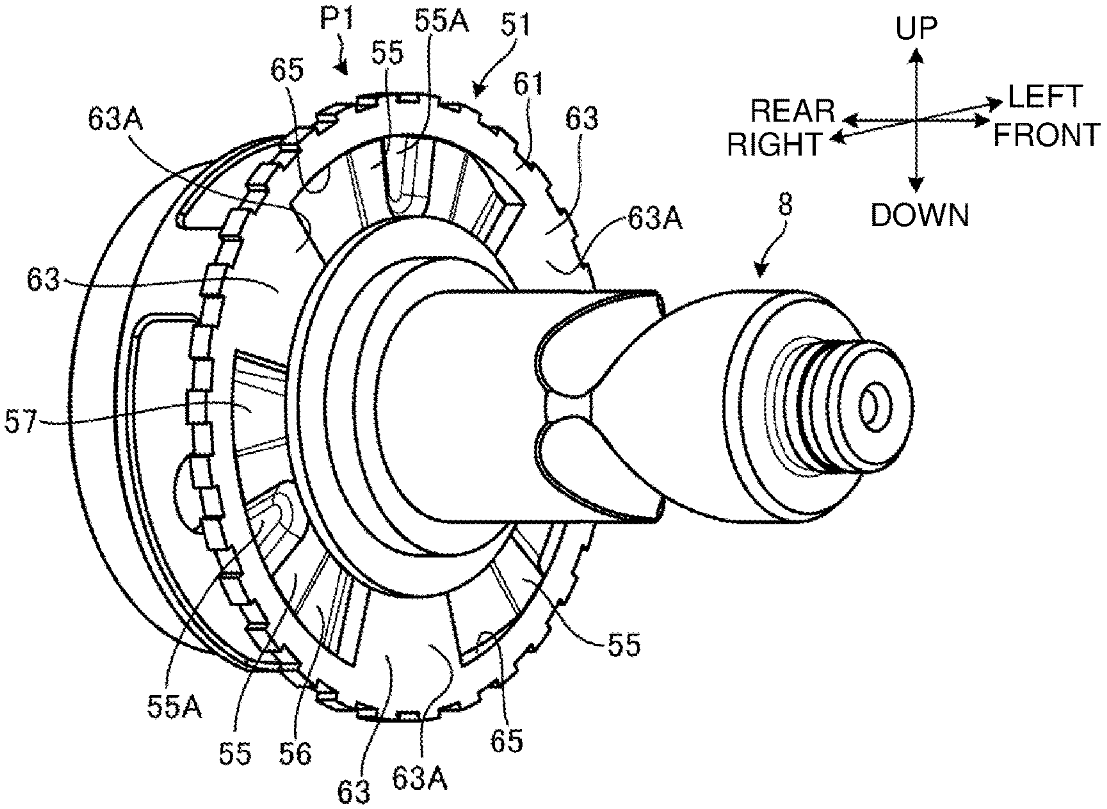
FIG. 11 is a diagram of the cam in the impact tool according to the embodiment, showing an example supported state.

FIG. 11 is a diagram of the first cam 51 in the impact tool 1 according to the embodiment, showing an example supported state. FIG. 11 shows the first cam 51 supported on the first support surfaces 54 at a first position P1. This allows the rear end faces 63B of the connecting portions 63 to be supported on the first support surfaces 54. The first cam 51 is then supported on the second cam 52 at the first position P1. In this state, the second support surfaces 55 and the slopes 56 and 57 are located inside the openings 65 and protrude frontward relative to the connecting portions 63. The first cam 51 is thus supported on the first support surfaces 54 without interfering with the second support surfaces 55 and the slopes 56 and 57.

As shown in FIG. 11, the first cam 51 being supported at the first position P1 is rotated about the motor rotation axis AX against the elastic force from the coil spring 49. The projections 64 then move from the projection-receiving portions 55A over the first support surfaces 54, and then move along the first support surfaces 54 about the motor rotation axis AX. As the first cam 51 rotates, the projections 64 that have moved over the first support surfaces 54 move along the slopes 56 to reach the second support surfaces 55. The projections 64 are then received in the projection-receiving portions 55A as the first cam 51 rotates, as shown in FIG. 12.

Figure 12:
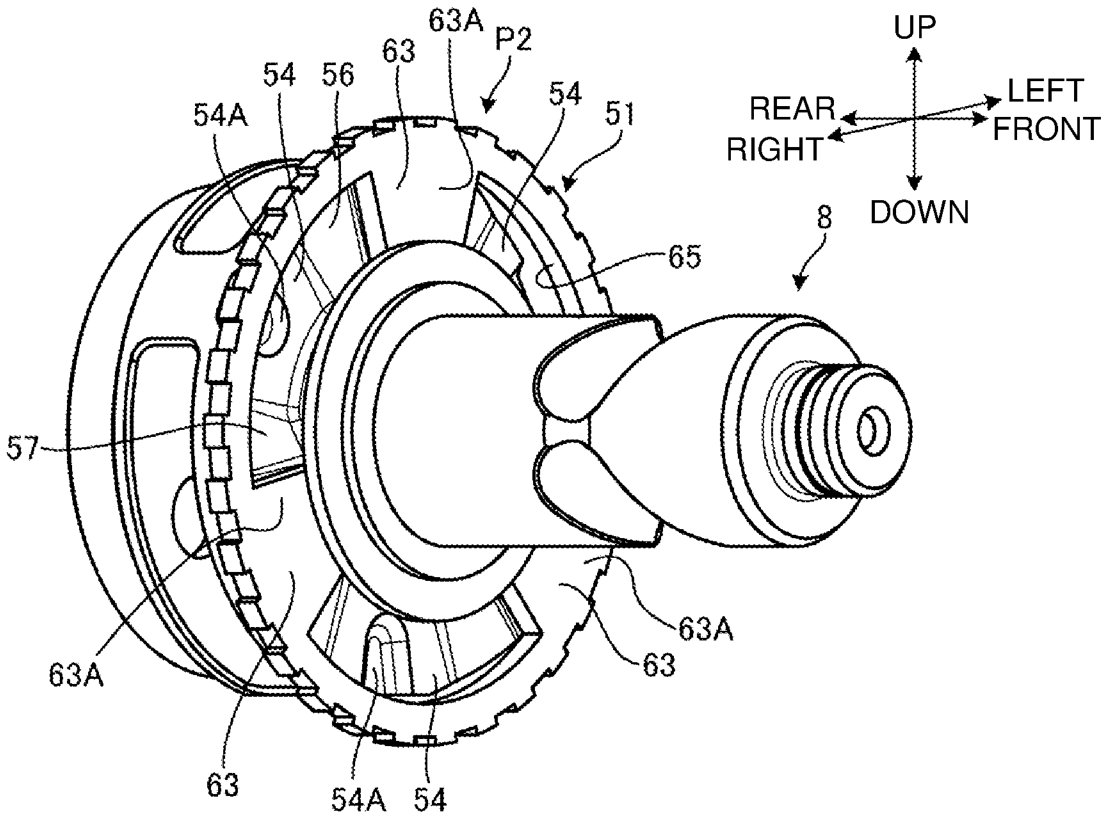
FIG. 12 is a diagram of the cam in the impact tool according to the embodiment, showing an example supported state.

FIG. 12 is a diagram of the first cam 51 in the impact tool 1 according to the embodiment, showing an example supported state. FIG. 12 shows the first cam 51 supported on the second support surfaces 55 at a second position P2. This allows the rear end faces 63B of the connecting portions 63 to be supported on the second support surfaces 55. The rear end faces 63B of the connecting portions 63 are then supported by the second cam 52 at the second position P2 frontward from the first position P1. In this state, the first support surfaces 54 and the slopes 56 and 57 are located inside the openings 65 rearward from the first cam 51. The first cam 51 is thus supported on the second support surfaces 55 without interfering with the second support surfaces 55 and the slopes 56 and 57.

As the first cam 51 rotates about the motor rotation axis AX, the first cam 51 is supported alternately on the first support surfaces 54 and on the second support surfaces 55. Thus, the first cam 51 is supported to switch the support position between the first position P1 and the second position P2 by rotating about the motor rotation axis AX.

Figure 13:
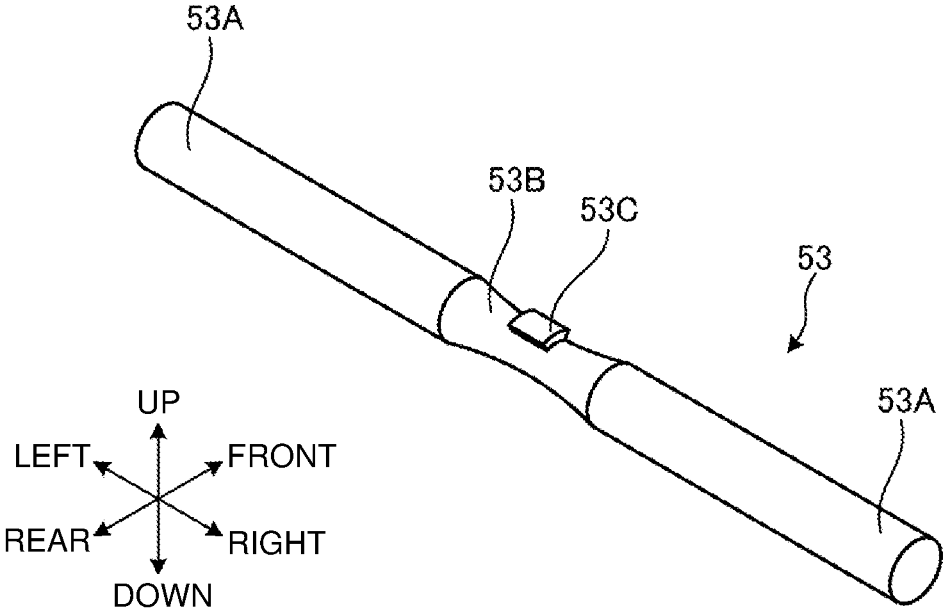
FIG. 13 is a perspective view of an example locking member in the impact tool according to the embodiment.

The impact tool 1 includes a locking member 53 (lock) that restricts the rotation of the first cam 51. The locking member 53 is located below the first cam 51. FIG. 13 is a perspective view of the locking member 53 in the embodiment. As shown in FIG. 13, the locking member 53 includes a base 53A, a smaller-diameter portion 53B, and an engagement portion 53C. The base 53A, the smaller-diameter portion 53B, and the engagement portion 53C are formed, for example, as a single member, but are not limited to this structure.

The base 53A is, for example, cylindrical with the central axis perpendicular to the motor rotation axis AX. The smaller-diameter portion 53B is located at the middle of the base 53A in the axial direction. The smaller-diameter portion 53B has, for example, a diameter smaller toward the middle in the axial direction with respect to the base 53A. The smaller-diameter portion 53B has a shape that is partially cut along the outer circumference of the outer ring 62 in the first cam 51. The engagement portion 53C is located at the middle of the smaller-diameter portion 53B in the axial direction. The engagement portion 53C is shaped to be engageable with the recess-protrusion portion 66 of the first cam 51. The engagement portion 53C in the present embodiment protrudes from the smaller-diameter portion 53B and is accommodated in the recess 66B. The engagement portion 53C accommodated in the recess 66B is engaged with the recess-protrusion portion 66.

Figure 14:
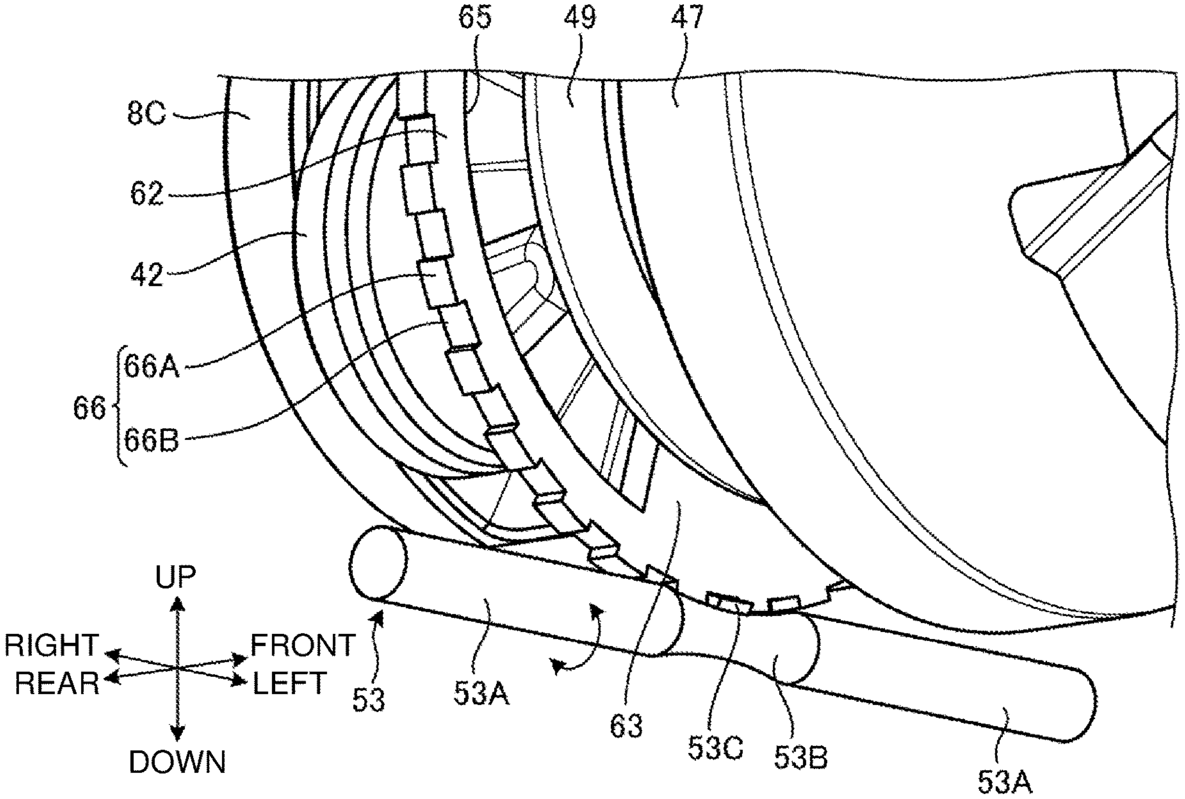
FIG. 14 is a perspective view of the cam and the locking member in the impact tool according to the embodiment.

FIG. 14 is a perspective view of the first cam 51 and the locking member 53 in the impact tool 1 according to the embodiment. As shown in FIG. 14, the locking member 53 is rotatable about the central axis. The locking member 53 is switchable between being engaged and being disengaged by rotating about the central axis. In the locking member 53 being engaged, the engagement portion 53C engages with the recess-protrusion portion 66. In the locking member 53 being disengaged, the engagement portion 53C does not engage with the recess-protrusion portion 66. The smaller-diameter portion 53B allows the locking member 53 and the outer ring 62 in the first cam 51 to avoid interfering with each other.

The impact tool 1 includes a rotator (not shown) that rotates the locking member 53 about its central axis. The rotator is, for example, a lever 70 shown in FIG. 5. The lever 70 is located adjacent to the grip 22. The lever 70 is joined to the base 53A. Rotating the lever 70 rotates the base 53A about the central axis. This causes the engagement portion 53C to switch between being engaged and being disengaged.

Figure 15:
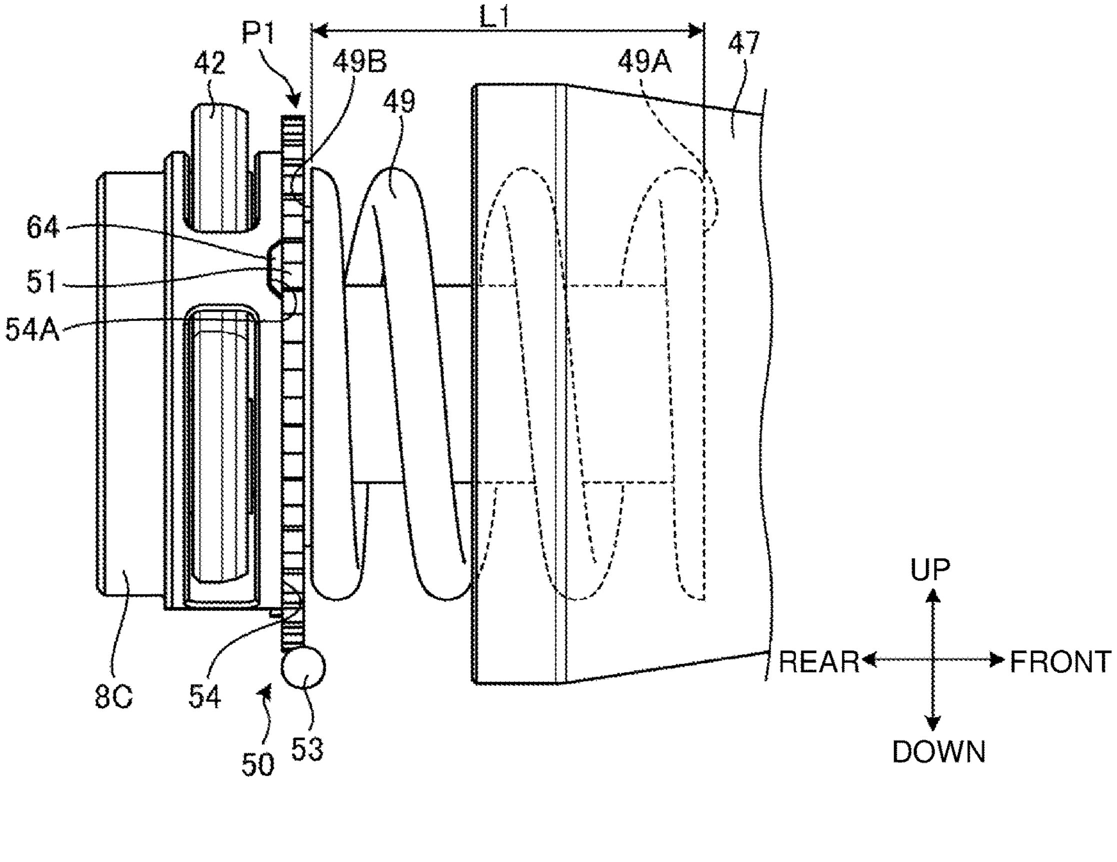
FIG. 15 is a diagram of the cam in the impact tool according to the embodiment, showing an example supported state.

FIG. 15 is a diagram of the first cam 51 in the impact tool 1 according to the embodiment, showing an example supported state. FIG. 15 shows the first cam 51 supported on the first support surfaces 54 at the first position P1. The projections 64 on the first cam 51 are received in the projection-receiving portions 54A, causing the rear end faces 63B of the connecting portions 63 to be supposed on the first support surfaces 54. The first cam 51 is then supported on the second cam 52 at the first position P1. In this state, the second support surfaces 55 and the slopes 56 and 57 are located inside the openings 65 and protrude frontward relative to the connecting portions 63. The first cam 51 is thus supported on the first support surfaces 54 without interfering with the second support surfaces 55 and the slopes 56 and 57.

The first cam 51 supported on the first support surfaces 54 supports the rear end 49B of the front coil spring 49 in front of the first cam 51. The coil spring 49 has the front end 49A supported by the hammer 47 and the rear end 49B supported by the first cam 51. In this case, the coil spring 49 has an initial length L1. A first elastic force corresponding to the initial length L1 is applied to the hammer 47.

In the state shown in FIG. 15, when the engagement portion 53C of the locking member 53 is disengaged from the first cam 51, the first cam 51 is pressed against the second cam 52 under the elastic force received from the coil spring 49. Rotating the motor 6 thus causes the spindle 8 and the hammer 47 to rotate together about the motor rotation axis AX.

In contrast, when the engagement portion 53C of the locking member 53 is engaged with the first cam 51, rotating the motor 6 causes the spindle 8 and the hammer 47 to rotate about the motor rotation axis AX independently of the first cam 51. This causes the second cam 52 and the first cam 51 to rotate about the motor rotation axis AX.

The rotation of the first cam 51 relative to the second cam 52 causes the projections 64 to move onto the first support surfaces 54 from the projection-receiving portions 55A and then move along the first support surfaces 54 about the motor rotation axis AX. Further rotation of the first cam 51 relative to the second cam 52 causes the projections 64 that have moved over the first support surfaces 54 to pass over the slopes 56 to reach the second support surfaces 55. The projections 64 that have reached the second support surfaces 55 are then received in the projection-receiving portions 55A as the first cam 51 rotates.

Figure 16:
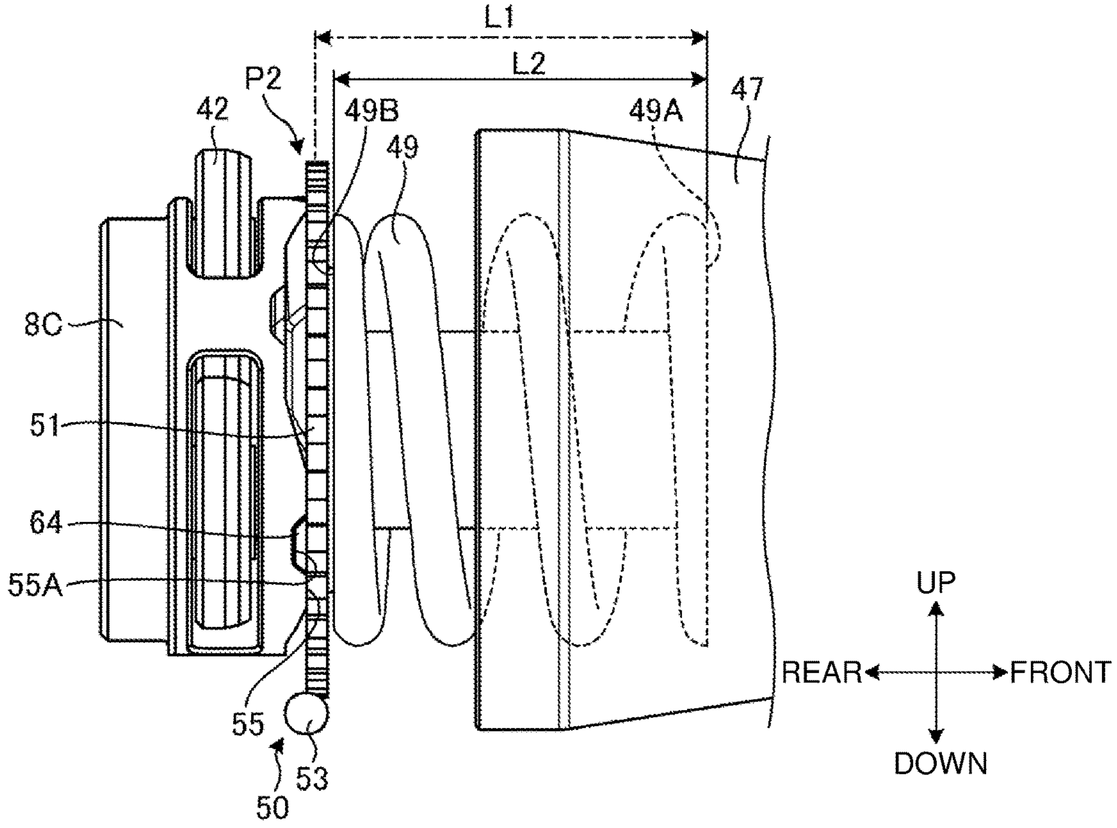
FIG. 16 is a diagram of the cam in the impact tool according to the embodiment, showing an example supported state.

FIG. 16 is a diagram of the first cam 51 in the impact tool 1 according to the embodiment, showing an example supported state. FIG. 16 shows the first cam 51 supported on the second support surfaces 55 at the second position P2 located frontward from the first position P1. The projections 64 on the first cam 51 are received in the projection-receiving portions 55A, causing the rear end faces 63B of the connecting portions 63 to be supposed on the second support surfaces 55. The first cam 51 is then supported on the second cam 52 at the second position P2. In this state, the first support surfaces 54 and the slopes 56 and 57 are located inside the openings 65 rearward from the first cam 51. The first cam 51 is thus supported on the second support surfaces 55 without interfering with the second support surfaces 55 and the slopes 56 and 57.

The first cam 51 supported on the second support surfaces 55 is located frontward along the motor rotation axis AX, as compared with when supported on the first support surfaces 54. In this case, the coil spring 49 has an initial length L2 shorter than the L1. A second elastic force corresponding to the initial length L2 is applied to the hammer 47. The coil spring 49 deforms more elastically when being supported at the initial length L2 than when being supported at the initial length L1. Thus, the second elastic force corresponding to the initial length L2 is greater than the first elastic force corresponding to the initial length L1. In this state, the hammer 47 receives an elastic force greater than the elastic force corresponding to the initial length L1.

In the state shown in FIG. 16, when the engagement portion 53C of the locking member 53 is disengaged from the first cam 51, the first cam 51 is pressed against the second cam 52 under the elastic force received from the coil spring 49. Rotating the motor 6 thus causes the spindle 8 and the hammer 47 to rotate together about the motor rotation axis AX.

In contrast, when the engagement portion 53C of the locking member 53 is engaged with the first cam 51, rotating the motor 6 causes the spindle 8 and the hammer 47 to rotate about the motor rotation axis AX independently of the first cam 51. This causes the second cam 52 and the first cam 51 to rotate about the motor rotation axis AX.

Figure 17:
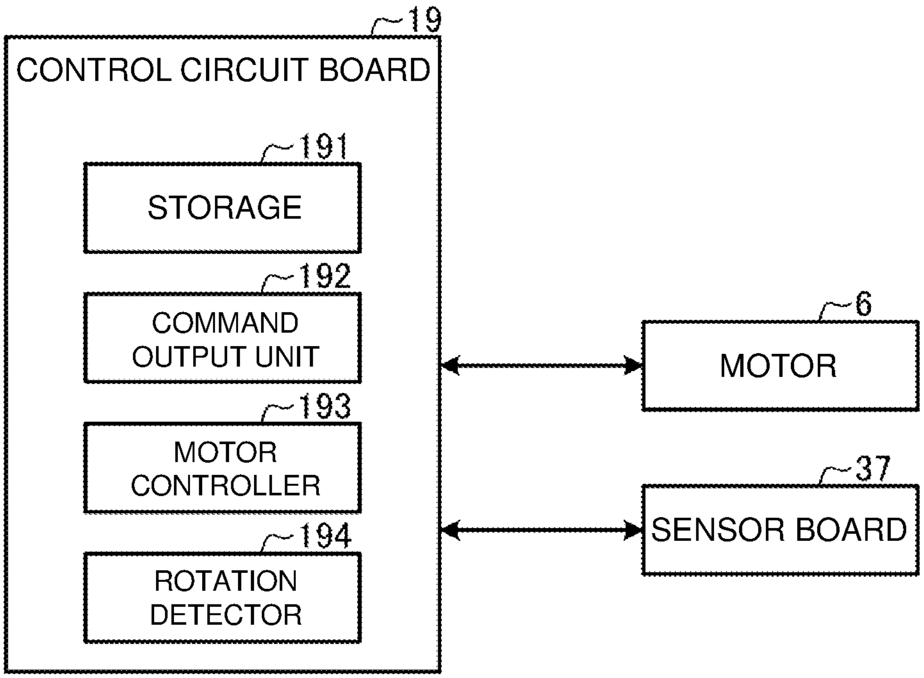
FIG. 17 is a block diagram of the impact tool according to the embodiment.

FIG. 17 is a block diagram of the impact tool 1 according to the embodiment. As shown in FIG. 17, the control circuit board 19 includes a storage 191, a command output unit 192, a motor controller 193, and a rotation detector 194.

The storage 191 stores multiple operation modes (maximum, hard, medium, and soft impact modes, and wood, Teks, and bolt modes) of the motor 6. The multiple operating modes of the motor 6 include at least two operation modes with different rotational speeds of the motor 6. The switchable operation modes of the motor 6 thus allow the impact tool 1 to be set to at least two levels of a first rotational speed and a second rotational speed different from the first rotational speed.

The operation unit 56B on the operation display 16 is operable to cause the command output unit 192 to output a mode command for setting the operation mode. In other words, the command output unit 192 outputs, based on the operation signal from the circuit board, a mode command for setting the operation mode of the motor 6.

In response to the mode command output from the command output unit 192, the motor controller 193 outputs a motor control signal for controlling the motor 6. In accordance with the operation mode set through the operation unit 56B, the motor controller 193 controls the motor 6.

The rotation detector 194 detects the rotational position of the first cam 51. The rotation detector 194 detects changes in the value of the current flowing through the motor 6. The rotation detector 194 detects changes in the current value of the motor 6 when rotating the first cam 51, and detects the rotational position of the first cam 51 based on the changes in the current value.

For example, when rotating the first cam 51, the current value of the motor 6 rapidly increases when the projections 64 move onto the first support surfaces 54 from the projection-receiving portions 54A or onto the second support surfaces 55 from the projection-receiving portions 55A. Further, when the projections 64 are received in the projection-receiving portions 55A or the projection-receiving portions 54A, the current value of the motor 6 decreases rapidly. After the projections 64 moving onto the first support surfaces 54 or the second support surfaces 55 from the projection-receiving portions 54A or from the projection-receiving portions 55A, the current value of the motor 6 gradually increases when moving over the slopes 56 until the projections 64 are received in the next projection-receiving portions 55A or 54A. The current value of the motor 6 gradually decreases when moving down the slopes 57.

The rotation detector 194 thus detects a predetermined period between a rapid increase in the current value and a rapid decrease in the current value of the motor 6, and whether the current value gradually increases or decreases within this predetermined period. When the rotation detector 194 detects the current value gradually increasing within the predetermined period, the rotation detector 194 determines that the first cam 51 is placed at the rotational position at which the projections 64 are received in the projection-receiving portions 55A. When the rotation detector 194 detects the current value gradually decreasing within the predetermined period, the rotation detector 194 determines that the first cam 51 is placed at the rotational position at which the projections 64 are received in the projection-receiving portions 54A.

A sensor detection magnet may be attached to the first cam 51, and a rotation detection element such as a Hall device may be placed near the sensor detection magnet and the first cam 51. In this case, the rotation detection element detects the position of the sensor magnet on the first cam 51 to detect the position of the first cam 51 in the rotation direction.

The impact tool 1 according to the embodiment sets the elastic force from the coil spring 49 in two levels corresponding to the first elastic force and the second elastic force in a switchable manner, by switching the support position of the first cam 51 between the first position P1 and the second position P2. The impact tool 1 also sets the operation modes of the motor 6 in at least two levels corresponding to the first rotational speed and the second rotational speed in a switchable manner.

FIG. 18 shows the relationship between the operation mode of the impact tool 1 according to the embodiment, the rotational speed of the motor 6, and the elastic force from the coil spring 49. As shown in FIG. 18, the impact tool 1 is operable in at least four operation modes, or a first mode, a second mode, a third mode, and a fourth mode.

In the first mode, the rotational speed of the motor 6 is the first rotational speed, and the elastic force from the coil spring 49 is the first elastic force. In the second mode, the rotational speed of the motor 6 is the first rotational speed, and the elastic force from the coil spring 49 is the second elastic force. In the third mode, the rotational speed of the motor 6 is the second rotational speed, and the elastic force from the coil spring 49 is the first elastic force. In the fourth mode, the rotational speed of the motor 6 is the second rotational speed, and the elastic force from the coil spring 49 is the second elastic force.

As shown in FIG. 18, the impact tool 1 is operated in at least four operation modes by switching the rotational speed of the motor 6 and the elastic force from the coil spring 49 in combination in two levels. This allows the operator to select an appropriate operation mode for a task. This allows the impact tool with the mechanical structure to strike an anvil with a striking force appropriate for a task. When the rotational speed of the motor 6 can be set to three or more levels, or when the elastic force from the coil spring 49 can be set to three or more levels, the impact tool 1 is operable in more operation modes.

The operation of the impact tool 1 will now be described. To perform, for example, a screwing operation on a workpiece, a tip tool (screwdriver bit) for the screwing operation is placed into the tool hole 10A in the anvil 10. The tip tool in the tool hole 10A is held by the tool holder 11. After the tip tool is received in the anvil 10, the operator operates the lever 70 to disengage the first cam 51 from the engagement portion 53C. The operator then, for example, holds the grip 22 with the right hand and pulls the trigger lever 14 with the right index finger. Power is then supplied from the battery pack 25 to the motor 6 to activate the motor 6 and turn on the light assemblies 18 simultaneously. As the motor 6 is activated, the rotor shaft 33 in the rotor 27 rotates. The rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are supported by the spindle 8 in a rotatable manner with the pin 42P in between. The revolving planetary gears 42 rotate the spindle 8 at a lower rotational speed than the rotor shaft 33. Additionally, the first cam 51 and the engagement portion 53C are disengaged from each other. Thus, the first cam 51 is held on the second cam 52 under the elastic force from the coil spring 49 and rotates integrally with the spindle 8.

When the spindle 8 rotates with the hammer 47 and the anvil protrusions 102 in contact with each other, the anvil 10 rotates together with the hammer 47 and the spindle 8. Thus, the screwing operation proceeds.

When the anvil 10 receives a predetermined or higher load as the screwing operation proceeds, the anvil 10 and the hammer 47 stop rotating. When the spindle 8 rotates in this state, the hammer 47 moves backward. The hammer 47 and the anvil protrusions 102 are then out of contact from each other. The hammer 47 that has moved backward moves forward while rotating under the elastic force from the coil spring 49. Thus, the anvil 10 is struck by the hammer 47 in the rotation direction. The anvil 10 thus rotates about the motor rotation axis AX at high torque. The screw is thus fastened to the workpiece under high torque.

To change the striking force from the hammer 47 in a screwing operation, the operator operates the lever 70 to engage the first cam 51 with the engagement portion 53C. The operator then, for example, holds the grip 22 with the right hand and pulls the trigger lever 14 with the right index finger. Power is then supplied to the motor 6 to activate the motor 6. As the motor 6 is activated, the rotation is transmitted to the spindle 8 through the rotor shaft 33, the pinion gear 41, and the planetary gears 42, and then the spindle 8 rotates. In this case, the first cam 51 and the engagement portion 53C are engaged with each other. Thus, the first cam 51 and the spindle 8 rotate relative to each other. This causes the projections 64 on the first cam 51 to move onto the first support surfaces 54 or onto the second support surfaces 55 from the projection-receiving portions 54A or the projection-receiving portions 55A, move along the slopes 56 or the slopes 57, and be received in the projection-receiving portions 55A of the second support surfaces 55 or the projection-receiving portions 54A of the first support surfaces 54. This causes the support position of the first cam 51 to switch between the first position P1 and the second position P2. This changes the elastic force from the coil spring 49, thus changing the striking force from the hammer 47. The operator can change the striking force from the hammer 47 in multiple levels by switching the rotational speed of the motor 6, in addition to changing the elastic force from the coil spring 49.

The impact tool 1 according to the embodiment includes the motor 6, the hammer 47 rotatable by the motor 6, the anvil 10 that receives a tip tool and strikable by the hammer 47 in the rotation direction, the coil spring 49 that has the front end 49A supporting the hammer 47 and extends and contracts in the front-rear direction to apply an elastic force to the hammer 47 toward the anvil 10, and the positioner 50 that supports the rear end 49B of the coil spring 49 and can change the support position of the positioner 50 supporting the rear end 49B of the coil spring 49 in the front-rear direction.

The positioner 50 can change the length of the coil spring 49 from the front end 49A to the rear end 49B by changing the support position of the rear end 49B of the coil spring 49. This allows the elastic force applied from the coil spring 49 to the hammer 47 to be changeable. This allows the impact tool 1 to strike the anvil 10 with a striking force appropriate for a task.

The positioner 50 in the embodiment may switch the support position between the multiple positions in the front-rear direction.

This allows the elastic force applied from the coil spring 49 to the hammer 47 to be switchable in the multiple levels. The striking force to strike the anvil 10 can thus be easily adjusted.

The positioner 50 in the embodiment includes the first cam 51 that is rotatable in response to rotation of the motor 6 and moves in the front-rear direction. The rear end 49B of the coil spring 49 may be supported by the first cam 51.

This allows the support position of the coil spring 49 to be changeable in the front-rear direction in cooperation with the rotation of the motor 6. The operator can thus easily switch the support position of the coil spring 49.

The impact tool 1 according to the embodiment further includes the spindle 8 located behind the anvil 10 to transmit a rotational force from the motor 6 to the anvil 10. The spindle 8 includes the flange 8A supporting the first cam 51 from the rear. The flange 8A has the multiple first support surfaces 54 and the multiple second support surfaces 55 located at different positions in the front-rear direction about the motor rotation axis AX. The first cam 51 may be located to be supported on either the multiple first support surfaces

54 or the multiple second support surfaces 55 in a manner switchable in accordance with the rotational position.

This allows the rotational position of the first cam 51 to be switchable using the multiple first support surfaces 54 and the multiple second support surfaces 55 on the flange 8A of the spindle 8. The rotational position of the first cam 51 can thus be switched easily.

The impact tool 1 according to the embodiment may further include a locking member 53 that restricts the rotation of the first cam 51.

This prevents the first cam 51 from rotating when the motor 6 rotates. Thus, the relative rotational position can be easily adjusted between the first cam 51 and other components in cooperation with the rotation of the motor 6.

The first cam 51 in the embodiment is disc-shaped and includes the recess-protrusion portions 66 arranged on its outer circumference in the circumferential direction. The locking member 53 includes the engagement portion 53C engageable with a recess-protrusion portion 66 of the recess-protrusion portions 66 of the first cam 51. The engagement portion 53C may be switchable between being engaged with and being disengaged from the recess-protrusion portion 66.

This allows easy locking or unlocking of the rotation of the first cam 51. The first cam 51 can thus be easily locked or unlocked.

The engagement portion 53C in the embodiment may be located below the first cam 51.

This prevents interference with other components of the impact tool 1.

The impact tool 1 according to the embodiment may further include the motor compartment 21 accommodating the motor 6, the grip 22 extending downward from the motor compartment 21, and the lever 70 located adjacent to the grip 22 to switch the engagement portion 53C between being engaged and being disengaged.

This allows the operator to easily lock or unlock the first cam 51.

The impact tool 1 according to the embodiment may further include a rotation detector 194 that detects the rotational position of the first cam 51.

The support position of the coil spring 49 can thus be determined easily.

The rotation detector 194 in the embodiment may include a Hall device 195.

The rotational position of the first cam 51 is detected accurately using the detection results from the Hall device 195.

The rotation detector 194 in the embodiment may include a current detector that detects changes in the value of the current flowing through the motor 6.

The rotational position of the first cam 51 is detected accurately using the changes in the value of the current flowing through the motor 6 without a separate detection system being installed.

The impact tool 1 may include the motor 6, the hammer 47 rotatable by the motor 6, and the anvil 10 that receives a tip tool and is strikable by the hammer 47 in the rotation direction. The elastic force applied to the hammer 47 is adjustable toward the anvil 10.

This allows the elastic force applied to the hammer 47 to be changed as appropriate for a task. This allows the impact tool 1 to strike the anvil 10 with a striking force appropriate for a task.

The impact tool 1 may include the motor 6, the hammer 47 rotatable by the motor 6, the anvil 10 that receives a tip tool and is strikable by the hammer 47 in the rotation direction, the coil spring 49 extendable and contractable in the front-rear direction to apply the elastic force to the hammer 47 toward the anvil 10, and the positioner 50 that changes the initial length of the coil spring 49.

The positioner 50 can change the elastic force applied from the coil spring 49 to the hammer 47 by changing the initial length of the coil spring 49. This allows the impact tool 1 to strike the anvil 10 with a striking force appropriate for a task.

The impact tool 1 may include the motor 6 that can be set to rotate at the first rotational speed or the second rotational speed, the hammer 47 rotatable by the motor 6, the anvil 10 that receives a tip tool and is strikable by the hammer 47 in the rotation direction, the coil spring 49 that can be set between the first elastic force and the second elastic force and apply the elastic force to the hammer 47 toward the anvil 10. The impact tool 1 is operable in the first mode with the first rotational speed and the first elastic force, the second mode with the first rotational speed and the second elastic force, the third mode with the second rotational speed and the first elastic force, and the fourth mode with the second rotational speed and the second elastic force.

The rotational speed of the motor 6 and the elastic force from the coil spring 49 can be set in two levels, and the combination of the rotational speeds and the elastic forces allows operation in four operation modes. This allows the operator to select an appropriate operation mode for a task. This allows the impact tool 1 with the mechanical structure to strike the anvil 10 with a striking force appropriate for a task.

The technical scope of the present invention is not limited to the above embodiments, and the embodiment may be modified without departing from the spirit and scope of the present invention. In the embodiment described above, for example, the elastic member that applies the elastic force to the hammer 47 is the coil spring 49. The elastic member is not limited to the coil spring 49. The elastic member may be a spring of another type, such as a leaf spring, or a spring with another shape, such as an S-shaped spring, in addition to the coil spring.

In the above embodiment, the impact tool 1 is an impact driver. The impact tool 1 is not limited to the impact driver. The impact tool 1 may include, for example, an impact wrench.

In the above embodiment, the impact tool 1 may use utility power (alternating current power supply) instead of the battery pack 25.

REFERENCE SIGNS LIST

G1 first distance
G2 second distance
P1 first position
P2 second position
AX motor rotation axis
1 impact tool
2 housing
2L left housing
2R right housing
2S, 3S, 29S screw
3 rear cover
4 hammer case
5A hammer case cover
5B bumper
6 motor
7 reducer
8 spindle
8A flange

8B spindle shaft
8C, 24B, 66A protrusion
8D spindle groove
9 striker
10 anvil
10A tool hole
10B anvil recess
11 tool holder
12 fan
12A bush
13 battery mount
14 trigger lever
15 forward-reverse switch lever
16 operation display
17 mode switch
18 light assembly
19 control circuit board
19B, 22B, 23B, 49B rear end
19C board case
19S surface
20A inlet
20B outlet
21 motor compartment
22 grip
22A, 23A, 49A front end
23 battery holder
24 bearing box
24A, 47C, 66B recess
25 battery pack
26 stator
27 rotor
28 stator core
29 front insulator
30 rear insulator
31 coil
32 rotor core
33 rotor shaft
33F front shaft
33R rear shaft
34 rotor magnet
35 sensor magnet
37 sensor board
38 fusing terminal
39 rotor bearing
39F front rotor bearing
39R rear rotor bearing
41 pinion gear
42 planetary gear
42P pin
43 internal gear
44 spindle bearing
45 washer
46 anvil bearing
46A O-ring
47 hammer
47A hole
47B hammer groove
47D hammer protrusion
48 ball
49 coil spring
50 positioner
51 first cam
52 second cam
53 locking member
53A base
53B smaller-diameter portion
53C engagement portion
54 first support surface
54A, 55A projection-receiving portion
55 second support surface
56, 57 slope
56B operation unit
61 inner ring
62 outer ring
63 connecting portion
63A front end face
63B rear end face
64 projection
65 opening
66 recess-protrusion portion
70 lever
101 anvil shaft
102 anvil protrusion
191 storage
192 command output unit
193 motor controller
194 rotation detector
195 Hall device

What is claimed is:

1. An impact tool, comprising:

a motor;

a hammer rotatable by the motor;

an anvil strikable by the hammer in a rotation direction, the anvil being configured to receive a tip tool;

an elastic member having a front end supporting the hammer, the elastic member being extendable and contractable in a front-rear direction to apply an elastic force to the hammer toward the anvil; and a positioner supporting a rear end of the elastic member, the positioner being configured to change a support position of the positioner supporting the rear end of the elastic member in the front-rear direction, wherein:

the positioner switches the support position between a plurality of positions in the front-rear direction, the positioner includes a cam member rotatable in response to rotation of the motor and movable in the front-rear direction, and the rear end of the elastic member is supported by the cam member.

2. The impact tool according to claim 1, further comprising:

a lock configured to restrict rotation of the cam member.

3. The impact tool according to claim 2, wherein the cam member is disc-shaped and includes recess-protrusion portions arranged on an outer circumference in a circumferential direction, the lock includes an engagement portion engageable with a recess-protrusion portion of the recess-protrusion portions of the cam member, and the engagement portion is switchable between being engaged with and being disengaged from the recess-protrusion portion.

4. The impact tool according to claim 3, wherein the engagement portion is below the cam member.

5. The impact tool according to claim 4, further comprising:

a motor compartment accommodating the motor;

a grip extending downward from the motor compartment; and a lever located adjacent to the grip to switch the engagement portion between being engaged and being disengaged.

6. The impact tool according to claim 5, further comprising:

a detector configured to detect a rotational position of the cam member.

7. The impact tool according to claim 2, further comprising:

a detector configured to detect a rotational position of the cam member.

8. The impact tool according to claim 3, further comprising:

a detector configured to detect a rotational position of the cam member.

9. The impact tool according to claim 4, further comprising:

a detector configured to detect a rotational position of the cam member.

10. The impact tool according to claim 1, further comprising:

a spindle located behind the anvil to transmit a rotation force from the motor to the anvil, wherein the spindle includes a flange supporting the cam member from a rear, the flange has a plurality of support surfaces located at different positions in the front-rear direction about a rotation axis of the spindle, and the cam member is located to be supported on a support surface of the plurality of support surfaces in a manner switchable between the plurality of support surfaces in accordance with a rotation position.

11. The impact tool according to claim 10, further comprising:

a lock configured to restrict rotation of the cam member.

12. The impact tool according to claim 10, further comprising:

a detector configured to detect a rotational position of the cam member.

13. The impact tool according to claim 1, further comprising:

a detector configured to detect a rotational position of the cam member.

14. The impact tool according to claim 13, wherein the detector includes a Hall device.

15. The impact tool according to claim 13, wherein the detector includes a current detector configured to detect a change in a value of a current flowing through the motor.

16. An impact tool, comprising:

a motor;

a hammer rotatable by the motor;

an anvil strikable by the hammer in a rotation direction, the anvil being configured to receive a tip tool;

an elastic member having a front end supporting the hammer, the elastic member being extendable and contractable in a front-rear direction to apply an elastic force to the hammer toward the anvil; and a positioner supporting a rear end of the elastic member, the positioner being configured to change a support position of the positioner in the front-rear direction, the support position being a position where the positioner supports the rear end of the elastic member, wherein:

the positioner includes a cam member rotatable in response to rotation of the motor and movable in the front-rear direction, and the rear end of the elastic member is supported by the cam member.

17. An impact tool, comprising:

a motor;

a hammer rotatable by the motor;

an anvil strikable by the hammer in a rotation direction, the anvil being configured to receive a tip tool;

an elastic member extendable and contractable in a front-rear direction to apply an elastic force to the hammer toward the anvil; and a positioner configured to change an initial length of the elastic member between a plurality of initial lengths, the initial length of the elastic member being a length before operating the impact tool, wherein:

the positioner includes a cam member rotatable in response to rotation of the motor and movable in the front-rear direction, and a rear end of the elastic member is supported by the cam member.

* * * * *